US012645775B2

(12) United States Patent
Kita et al.

(10) Patent No.: US 12,645,775 B2
(45) Date of Patent: Jun. 2, 2026

(54) COMPUTER SYSTEM AND USER MANAGEMENT METHOD

(71) Applicant: Rakuten Mobile, Inc., Tokyo (JP)

(72) Inventors: Shinya Kita, Tokyo (JP); Kazushige Takeuchi, Tokyo (JP); Misato Okamoto, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 254 days.

(21) Appl. No.: 18/033,706

(22) PCT Filed: Jan. 22, 2021

(86) PCT No.: PCT/JP2021/002184
§ 371 (c)(1),
(2) Date: Apr. 25, 2023

(87) PCT Pub. No.: WO2022/157912
PCT Pub. Date: Jul. 28, 2022

(65) Prior Publication Data
US 2023/0394126 A1 Dec. 7, 2023

(51) Int. Cl.
*G06F 21/31* (2013.01)
*G06F 21/32* (2013.01)
*G06F 21/41* (2013.01)
(52) U.S. Cl.
CPC ...... *G06F 21/32* (2013.01); *G06F 2221/2117* (2013.01)
(58) Field of Classification Search
CPC ... G06F 21/32; G06F 2221/2117; G06F 21/31
USPC ......................................................... 726/1–2
See application file for complete search history.

(56) References Cited

U.S. PATENT DOCUMENTS

| | | | | |
|---|---|---|---|---|
| 9,720,668 | B2 * | 8/2017 | McGrath | G06F 9/45533 |
| 10,044,723 | B1 * | 8/2018 | Fischer | G06F 21/31 |
| 10,250,584 | B2 * | 4/2019 | Mikheev | G06F 21/41 |
| 10,686,794 | B2 * | 6/2020 | Sakurai | H04L 67/01 |
| 10,708,255 | B2 * | 7/2020 | Mikheev | G06F 21/41 |
| 11,144,365 | B1 * | 10/2021 | Gordon | G06F 21/31 |
| 11,971,849 | B2 * | 4/2024 | Gupta | G06F 16/21 |

(Continued)

FOREIGN PATENT DOCUMENTS

| | | |
|---|---|---|
| JP | 2013-182310 A1 | 9/2013 |
| JP | 2018-142332 A | 9/2018 |

(Continued)

OTHER PUBLICATIONS

International Search Report for PCT/JP2021/002184 dated Apr. 20, 2021.
Written Opinion for PCT/JP2021/002184 dated Apr. 20, 2021.

*Primary Examiner* — Bharat Barot
(74) *Attorney, Agent, or Firm* — Sughrue Mion, PLLC

(57) ABSTRACT

In a computer system, a tenant administrator performs user registration into and a login to a purchase manager, and then makes a request to purchase a tenant. Registered user information is stored into a marketplace user manager. An E2EO unit creates a tenant and then creates, for each tenant, a tenant user manager structured to authenticate and authorize a general user of a service. When a user who has performed the user registration into the purchase manager uses the service of the tenant, the tenant user manager delegates processing to the marketplace user manager.

10 Claims, 41 Drawing Sheets

(56) References Cited

U.S. PATENT DOCUMENTS

| | | | | |
|---|---|---|---|---|
| 11,995,173 | B2 * | 5/2024 | Ohhashi | .................. G06F 21/31 |
| 2017/0331812 | A1 | 11/2017 | Lander et al. | |
| 2017/0331813 | A1 | 11/2017 | Lander et al. | |
| 2018/0013763 | A1 | 1/2018 | Wilson et al. | |
| 2018/0039494 | A1 | 2/2018 | Lander et al. | |
| 2018/0097802 | A1 | 4/2018 | Lander et al. | |
| 2020/0013107 | A1 | 1/2020 | Kusano | |
| 2021/0360741 | A1 | 11/2021 | Shimojou et al. | |

FOREIGN PATENT DOCUMENTS

| | | | |
|---|---|---|---|
| JP | 2019-532418 | A | 11/2019 |
| JP | 2020-112886 | A1 | 7/2020 |
| WO | 2018/034321 | A1 | 2/2018 |
| WO | 2018/181826 | A1 | 10/2018 |
| WO | 2019/064678 | A1 | 4/2019 |

* cited by examiner

FIG.3

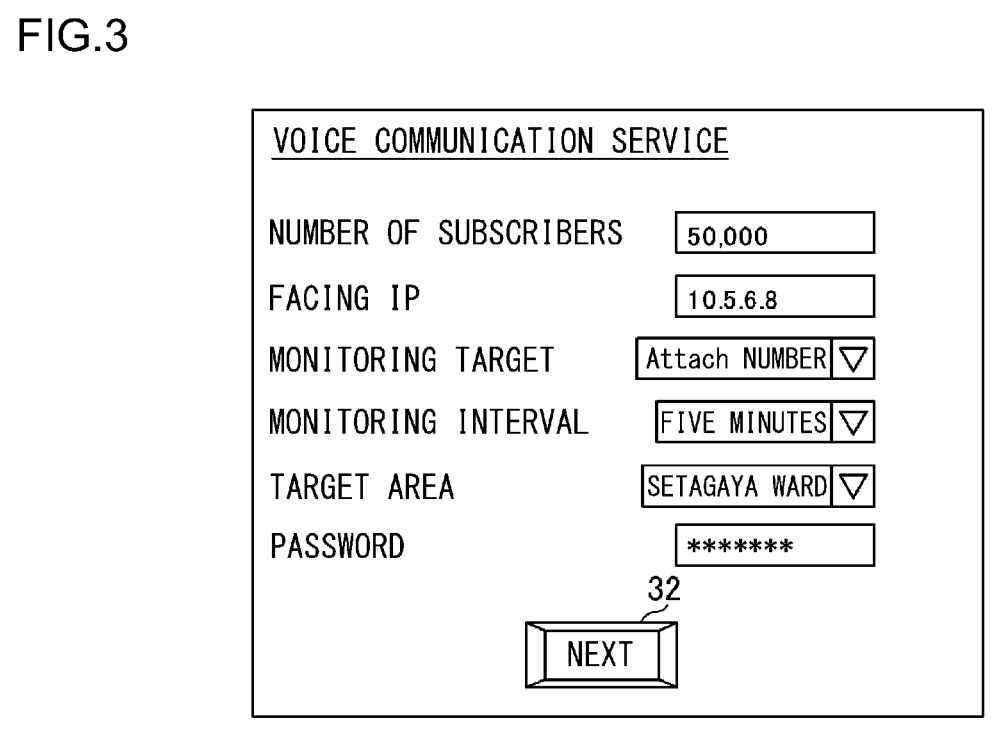

VOICE COMMUNICATION SERVICE

NUMBER OF SUBSCRIBERS    | 50,000 |

FACING IP    | 10.5.6.8 |

MONITORING TARGET    | Attach NUMBER ▽ |

MONITORING INTERVAL    | FIVE MINUTES ▽ |

TARGET AREA    | SETAGAYA WARD ▽ |

PASSWORD    | ******* |

32

| NEXT |

FIG.6

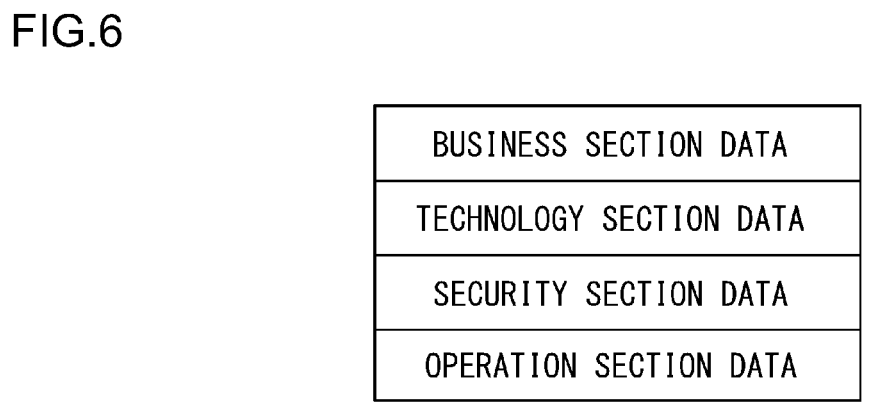

| |
|---|
| BUSINESS SECTION DATA |
| TECHNOLOGY SECTION DATA |
| SECURITY SECTION DATA |
| OPERATION SECTION DATA |

FIG.11

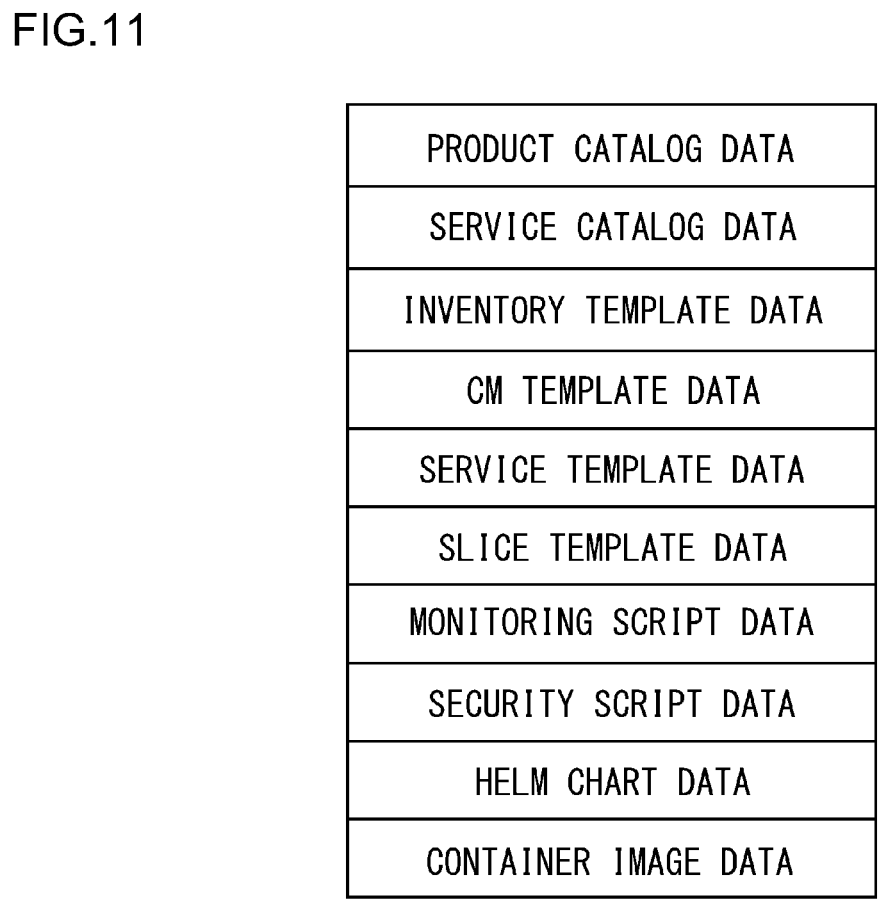

| PRODUCT CATALOG DATA |
|---|
| SERVICE CATALOG DATA |
| INVENTORY TEMPLATE DATA |
| CM TEMPLATE DATA |
| SERVICE TEMPLATE DATA |
| SLICE TEMPLATE DATA |
| MONITORING SCRIPT DATA |
| SECURITY SCRIPT DATA |
| HELM CHART DATA |
| CONTAINER IMAGE DATA |

FIG.12

| |
|---|
| SERVER ID |
| LOCATION DATA |
| BUILDING DATA |
| FLOOR NUMBER DATA |
| RACK DATA |
| ALLOCATED RESOURCE POOL GROUP ID |
| ALLOCATED RESOURCE POOL ID |
| SPECIFICATION DATA |
| NETWORK DATA |
| ACTIVE CONTAINER ID LIST |

FIG.14

| RESOURCE POOL GROUP ID | 100 |
|---|---|

| RESOURCE POOL ID | TOTAL CORE NUMBER DATA | REMAINING CORE NUMBER DATA | CNF TYPE DATA |
|---|---|---|---|
| A | 200 | 5 | · · · |
| B | 200 | 7 | CU,vCU,· · · |
| C | 200 | 1 | vDU,· · · |
| D | 200 | 3 | · · · |

| NUMBER OF AVAILABLE SERVERS | 8 |
|---|---|

FIG.15

| INVENTORY KEY | | |
|---|---|---|
| BUNDLE ID | | |
| USER ID | | |
| PURCHASE SERVICE REQUIREMENT DATA | FACING IP | |
| | MONITORING TARGET | |
| | MONITORING INTERVAL | |
| | PASSWORD | |
| FUNCTIONAL UNIT CONFIGURA-TION DATA | CNF TYPE DATA | |
| | HOST NAME DATA | |
| | IP ADDRESS DATA | |
| | CONTAINER CONFIGURA-TION DATA | CONTAINER ID |
| | | CONTAINER IMAGE ID |
| | | REQUIRED RESOURCE DATA |
| | | RESOURCE POOL GROUP ID |
| | | RESOURCE POOL ID |
| | | CONNECTION CONTAINER ID LIST |

FIG.16

| INVENTORY KEY | 00100 |
|---|---|
| BUNDLE ID | 0010 |
| USER ID | 001 |

| FACING IP | 10.5.6.8 |
|---|---|
| MONITORING TARGET | Attach NUMBER |
| MONITORING INTERVAL | FIVE MINUTES |
| PASSWORD | ****** |

| CNF TYPE DATA | HOST NAME DATA | IP ADDRESS DATA | CONTAINER CONFIGURATION DATA | | |
|---|---|---|---|---|---|
| P-GW | PGW_xx_1 | 10.2.3.1 | ... | ... | ... |
| P-GW | PGW_xx_2 | 10.2.3.2 | ... | ... | ... |
| P-GW | PGW_xx_3 | 10.2.3.3 | ... | ... | ... |
| IMS | IMS_xx_1 | 10.2.3.4 | ... | ... | ... |
| IMS | IMS_xx_2 | 10.2.3.5 | ... | ... | ... |
| IMS | IMS_xx_3 | 10.2.3.6 | ... | ... | ... |
| HSS | HSS_xx_1 | 10.2.3.7 | ... | ... | ... |
| HSS | HSS_xx_2 | 10.2.3.8 | ... | ... | ... |
| HSS | HSS_xx_3 | 10.2.3.9 | ... | ... | ... |

FIG.17

| DATA CENTER NAME | ESTIMATED BUSY LEVEL DATA |
|---|---|
| DATA CENTER A | 20,000 |
| DATA CENTER B | 10,000 |
| DATA CENTER C | 1,000 |

FIG.18

| RESOURCE POOL GROUP ID | 100 |
|---|---|

| RESOURCE POOL ID | TOTAL CORE NUMBER DATA | REMAINING CORE NUMBER DATA | CNF TYPE DATA |
|---|---|---|---|
| A | 200 | 5 | ・・・ |
| B | 200 | 7 | CU,vCU,・・・ |
| C | 250 | 46 | vDU,・・・ |
| D | 200 | 3 | ・・・ |

| NUMBER OF AVAILABLE SERVERS | 7 |
|---|---|

FIG.19

```
CNF PGW
  Pod1:
    container1:
      image: xxx
      CPU: xxx
      memory: xxx
      HDD: xxx
    container2:
      xxx Pod2: xxx Hostname:

```
CNF PGW
  Pod1:
    container1:
      image: xxx
      CPU: xxx
      memory: xxx
      HDD: xxx
    container2:
      xxx Pod2: xxx Hostname: PGW_xx_1

IP: 10.2.3.1
```

COMPUTER SYSTEM AND USER MANAGEMENT METHOD

This application is a National Stage of International Application No. PCT/JP2021/002184 filed Jan. 22, 2021.

TECHNICAL FIELD

The present invention relates to a data processing technology, and more particular, to a user management technology applied to a computer system.

BACKGROUND ART

As an example of a technology related to deployment of a functional unit in response to purchase of a network service, Patent Literature 1 discloses a technology of dividing an order of a product purchased by a customer into virtualized network function (VNF) units and deploying the VNFs onto a network functions virtualization infrastructure (NFVI). Patent Literature 2 discloses a technology of deploying a network functional unit in response to a deployment request to an available computing device so as to satisfy an isolation requirement that is a requirement regarding non-sharing. Patent Literature 3 discloses a technology of enabling a plurality of business operators to use, in a unique manner, all or some of a plurality of network slices managed by a host business operator.

Further, as an example of a technology of enhancing security of user access in a cloud-based environment, Patent Literature 4 discloses an identity management technology of performing authentication by calling an identity management service via an application programming interface (API) provided by a microservice.

CITATION LIST

Patent Literature

[Patent Literature 1] WO 2018/181826 A
[Patent Literature 2] WO 2019/64678 A
[Patent Literature 3] WO 2018/34321 A
[Patent Literature 4] JP 2018-142332 A

SUMMARY OF INVENTION

Technical Problem

There are various needs for a network service such as a configuration, a scale, and a target area of the network service. When various types of network services are constructed in accordance with such needs, various types of users such as providers and customers of the network services may make access to or update various types of information, and how to implement user management including authentication and grant of permission is always a major problem. Therefore, there is a demand for a user management technology capable of realizing high level of security without impairing flexibility of network services and convenience for users.

The present invention has been made in view of such a problem, and it is therefore an object of the present invention to provide a technology of enhancing security of user management of a network service. It is another object of the present invention to provide a technology of enhancing convenience of user access to a network service.

Solution to Problem

One aspect of the present invention relates to a computer system. The computer system is a computer system for providing a service corresponding to each of a plurality of tenants, the computer system including a tenant creation system structured to create a tenant upon receipt of a tenant creation request, and a tenant operating system structured to run the tenant created. The tenant operating system includes a tenant user manager structured to authenticate and authorize a user of the service, the tenant user manager being separated from the tenant creation system.

Another aspect of the present invention relates to a user management method. The user management method is applied to a computer system for providing a service corresponding to each of a plurality of tenants, the user management method including causing a tenant creation system to create a tenant upon receipt of a tenant creation request, causing a tenant operating system to run the tenant created, and causing the tenant operating system to authenticate and authorize a user of the service using a tenant user manager separated from the tenant creation system.

Note that any combination of the above-described components, or an entity that results from replacing expressions of the present disclosure among a computer program, a recording medium storing a computer program in a readable manner, and the like is also valid as an aspect of the present disclosure.

Advantageous Effects of Invention

According to the present invention, security of user management of a network service can be enhanced. Convenience of user access to a network service can be also enhanced.

BRIEF DESCRIPTION OF DRAWINGS

FIG. 3 is a diagram illustrating an example of a service requirement input screen.
FIG. 6 is a diagram illustrating an example of a data structure of a bundle file.
FIG. 11 is a diagram illustrating an example of a data structure of a data group created on the basis of the bundle file.
FIG. 12 is a diagram illustrating an example of a data structure of physical inventory data.
FIG. 14 is a diagram illustrating an example of resource management data.

FIG. 15 is a diagram illustrating an example of a data structure of planned data.

FIG. 16 is a diagram schematically illustrating an example of planned data.

FIG. 17 is a diagram illustrating an example of estimated busy level data.

FIG. 18 is a diagram illustrating an example of the resource management data.

FIG. 19 is a diagram illustrating an example of a CNFCD.

FIG. 20 is a diagram illustrating an example of a day0 parameter.

DESCRIPTION OF EMBODIMENTS

First, an aspect related to construction and management of a network service used in the present embodiment will be described in detail as an "underlying technology". Although this aspect is best suitable for a combination with the present invention, a configuration of a computer system applicable to the embodiment is not limited to the aspect. A user management technology based on the underlying technology will be described in detail with reference to FIG. 26 and subsequent drawings.

Embodiment Based on Underlying Technology

Figure 1:
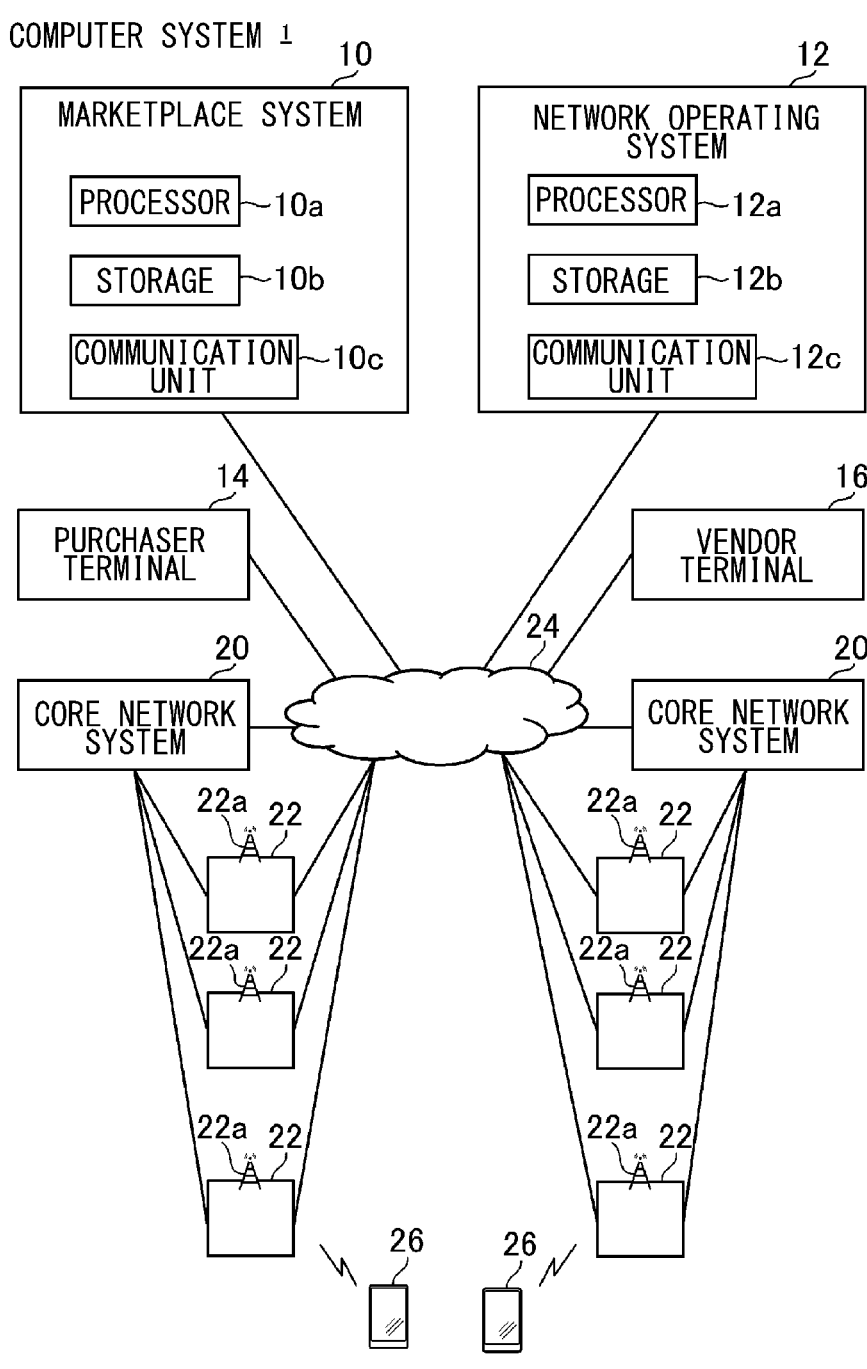
FIG. 1 is a diagram illustrating a computer system according to an underlying technology.

FIG. 1 is a diagram illustrating a computer system 1 according to the present embodiment. The computer system 1 is an information processing system that performs data processing related to construction and management of a network service.

As illustrated in FIG. 1, in the computer system 1, a marketplace system (MPS) 10, a network operating system (NOS) 12, a purchaser terminal 14, a vendor terminal 16, a plurality of core network systems 20, and a plurality of base station devices 22 are connected to a computer network 24 such as the Internet. The core network systems 20, the base station devices 22, and the computer network 24 cooperate with each other to implement a mobile radio communication network.

The core network system 20 is a system corresponding to an evolved packet core (EPC) in a fourth generation mobile communication system (hereinafter, referred to as 4G), or a fifth generation mobile communication system (hereinafter, referred to as 5G) core network (5GC) including an access and mobility management function (AMF), a session management function (SMF), a user plane function (UPF), and the like in a 5G. The core network system 20 according to the present embodiment is implemented by a group of servers placed in a plurality of data centers provided at various locations. Each data center has a plurality of servers placed therein. Although two core network systems 20 are illustrated in FIG. 1, the number of core network systems 20 according to the present embodiment is not limited to two, and may be one or three or more.

The base station device 22 is a computer system including an antenna 22a, corresponding to an eNodeB (eNB) in 4G or an NR base station (gNB) in 5G. The base station device 22 according to the present embodiment includes one or more servers (servers 90 to be described later). Note that the base station device 22 may be implemented by a group of servers placed in data centers.

Further, a virtual distributed unit (vDU) or a virtual central unit (vCU) that is a component of a radio access network (RAN) in 4G may be placed in the base station device 22 or may be incorporated into some of the core network systems 20. Similarly, a DU or a CU that is a component of a RAN in 5G may be placed in the base station device 22 or may be incorporated into some of the core network systems 20.

The MPS 10 according to the present embodiment is constructed on, for example, a cloud-based infrastructure and includes a processor 10*a*, a storage 10*b*, and a communication unit 10*c* as illustrated in FIG. 1. The processor 10*a* is a program control device such as a microprocessor that operates in accordance with a program installed in the MPS 10. The storage 10*b* is, for example, a storage element such as a ROM or a RAM, a solid state drive (SSD), or a hard disk drive (HDD). The storage 10*b* stores a program to be executed by the processor 10*a*, and the like. The communication unit 10*c* is, for example, a communication interface such as a network interface card (NIC) or a wireless LAN module. The communication unit 10*c* exchanges data with the NOS 12 or the purchaser terminal 14 over the computer network 24.

The NOS 12 according to the present embodiment is constructed on, for example, a cloud-based infrastructure and includes a processor 12*a*, a storage 12*b*, and a communication unit 12*c* as illustrated in FIG. 1. The processor 12*a* is a program control device such as a microprocessor that operates in accordance with a program installed in the NOS 12. The storage 12*b* is, for example, a storage element such as a ROM or a RAM, a solid state drive (SSD), or a hard disk drive (HDD). The storage 12*b* stores a program to be executed by the processor 12*a*, and the like. The communication unit 12*c* is, for example, a communication interface such as an NIC or a wireless LAN module. The communication unit 12*c* exchanges data with the MPS 10, the purchaser terminal 14, the vendor terminal 16, the core network system 20, or the base station device 22 over the computer network 24.

According to the present embodiment, in response to a request to purchase a network service from a purchaser, the network service for which the purchase request has been made is constructed in the core network system 20 or the base station device 22. Then, the network service thus constructed is provided to the purchaser.

For example, to a purchaser who is a mobile virtual network operator (MVNO), a network service such as a voice communication service or a data communication service is provided. The voice communication service or the data communication service provided according to the present embodiment is finally provided to a customer (end user) for the purchaser (MVNO in the above example), who uses a user equipment (UE) 26 illustrated in FIG. 1. The end user can perform voice communication or data communication with other users via the core network system 20 or the base station device 22.

Further, the network service provided according to the present embodiment is not limited to such a voice communication service or data communication service. The network service provided according to the present embodiment may be, for example, an IoT service. For example, an end user who uses a robot arm, a connected car, or the like may be a purchaser of the network service according to the present embodiment.

Further, according to the present embodiment, a containerized application execution environment such as a Docker is installed in a server placed in the core network system 20 or the base station device 22, and a container can be deployed to such a server to run on the server. The network service provided to the purchaser according to the present embodiment is implemented by a cloud-native network function component (CNFC) that is a container-based functional unit.

The purchaser terminal 14 according to the present embodiment is, for example, a general-purpose computer such as a smartphone, a tablet terminal, or a personal computer used by the above-described purchaser.

Figure 2:
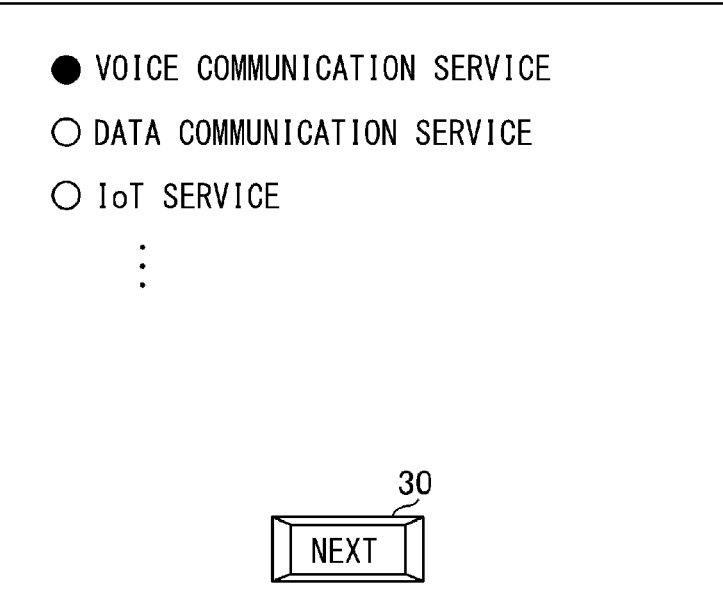
FIG. 2 is a diagram schematically illustrating an example of a purchase screen.

FIG. 2 is a diagram illustrating an example of a purchase screen displayed on the purchaser terminal 14 according to the present embodiment. On the purchase screen illustrated in FIG. 2, the purchaser can select a type of network service to be purchased via a radio button. Here, when the purchaser selects the voice communication service and clicks on a Next button 30, a service requirement input screen illustrated in FIG. 3 is displayed on the purchaser terminal 14.

On the service requirement input screen, the purchaser can input a service requirement for the network service to be purchased. In the example illustrated in FIG. 3, the number of subscribers, a facing IP, a monitoring target, a monitoring interval, a target area, and a password can be set. Note that the facing IP refers to an IP address serving as an access point for a network system already owned by the purchaser.

When the purchaser inputs such service requirements and clicks on a Next button 32, service requirement data corresponding to the input to the service requirement input screen is transmitted to the MPS 10.

The service requirement data includes, for example, subscriber number data showing the number of subscribers, facing IP data showing the facing IP, monitoring target data showing the monitoring target, monitoring interval data showing the monitoring interval of the monitoring target, target area data showing the target area of the network service to be purchased, and password data showing the password. Note that the service requirement data need not include all the pieces of data, and may include data showing requirements other than the above-described requirements.

Then, the MPS 10 checks, in cooperation with the NOS 12, whether it is possible to allocate a server that satisfies the service requirements shown by the service requirement data on the basis of the service requirement data. Specifically, a determination is made as to whether (1) it is possible to allocate a server that satisfies the service requirements, (2) it is possible to allocate a server that satisfies the service requirements by setting up an available server, or (3) it is not possible to allocate a server that satisfies the service requirements.

Figure 4:
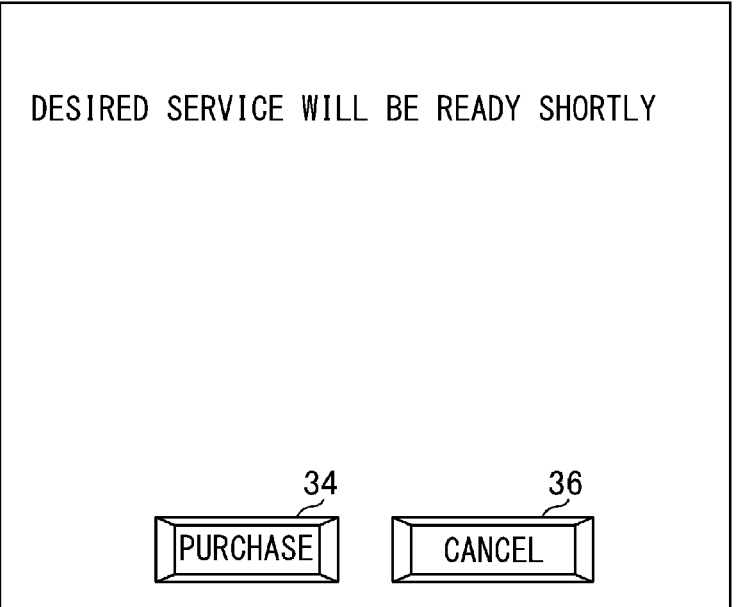
FIG. 4 is a diagram illustrating an example of a purchase confirmation screen.

Then, when the determination results in either (1) or (2), a purchase confirmation screen showing that the service will be available immediately is displayed on the purchaser terminal 14 as illustrated in FIG. 4. When the determination results in (3), a purchase confirmation screen showing that a predetermined delivery time is required (for example, a delivery time of two weeks is required) is displayed on the purchaser terminal 14 as illustrated in FIG. 5.

Figure 5:
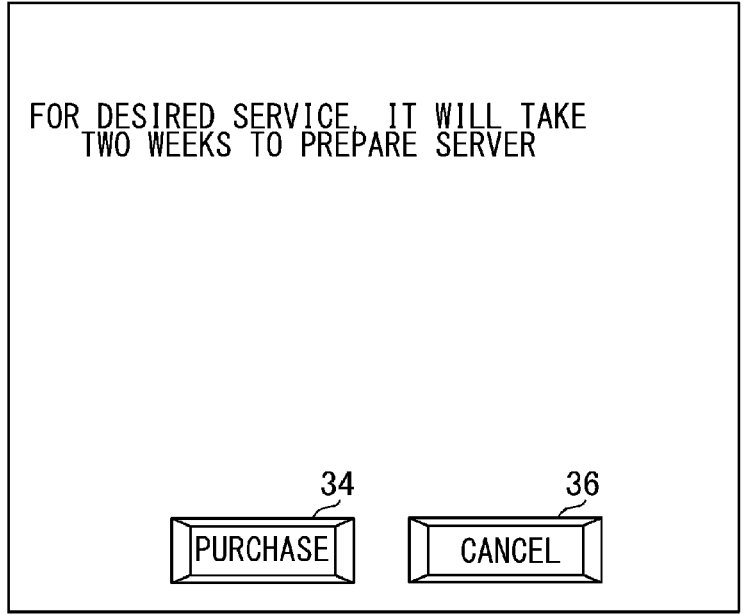
FIG. 5 is a diagram illustrating an example of the purchase confirmation screen.

Here, when the purchaser clicks on a Purchase button 34 illustrated in FIG. 4 or 5, the network service for which the purchase request has been made is constructed and provided to the purchaser.

On the other hand, when the purchaser clicks on a Cancel button 36 illustrated in FIG. 4 or 5, the purchase is canceled.

As described above, according to the present embodiment, a network service based on various needs of the purchaser is flexibly constructed. The purchaser can receive a desired network service only by specifying some service requirements without being aware of how the network service is implemented.

The vendor terminal 16 according to the present embodiment is a general-purpose computer such as a smartphone, a tablet terminal, or a personal computer used by a vendor such as a service provider related to a network service.

According to the present embodiment, a continuous integration (CI)/continuous delivery (CD) pipeline including a development environment, a verification environment, and a test environment is provided to the vendor. Then, according

7 to the present embodiment, a verified bundle file created by the vendor, corresponding to the network service to be provided to the purchaser, is onboarded through an onboarding process using the CI/CD pipeline.

The bundle file according to the present embodiment is, for example, a file (for example, a targz-format file) obtained by compressing a file group having a predetermined directory structure.

FIG. 6 is a diagram illustrating an example of a data structure of the bundle file according to the present embodiment. As illustrated in FIG. 6, the bundle file according to the present embodiment includes business section data, technology section data, security section data, and operation section data.

The business section data shows business requirements of the network service, such as a name of the network service, a license requirement, and definitions of a service level agreement (SLA). Further, the business section data according to the present embodiment includes data showing required input items and optional input items for the service requirements of the network service.

The technology section data shows, for example, a configuration of a functional unit group via which the network service is implemented. The technology section data further shows, for example, a configuration of an application or a CNFC constituting the network service.

The technology section data further shows, for example, a hierarchical structure of the network service (hereinafter, also referred to as an "NS"), and a network function (hereinafter, also referred to as a cloud-native network function (CNF)) and a CNFC as the lower levels of the network service. The technology section data further shows, for example, a hierarchical structure of the network service, and a network slice subnet (hereinafter, also referred to as an "NSSI") and a network slice (hereinafter, also referred to as an "NSI") as the upper levels of the network service. That is, the technology section data shows a hierarchical structure of a plurality of types of network elements, in other words, a correspondence relationship among the plurality of types of network elements.

Figure 7:
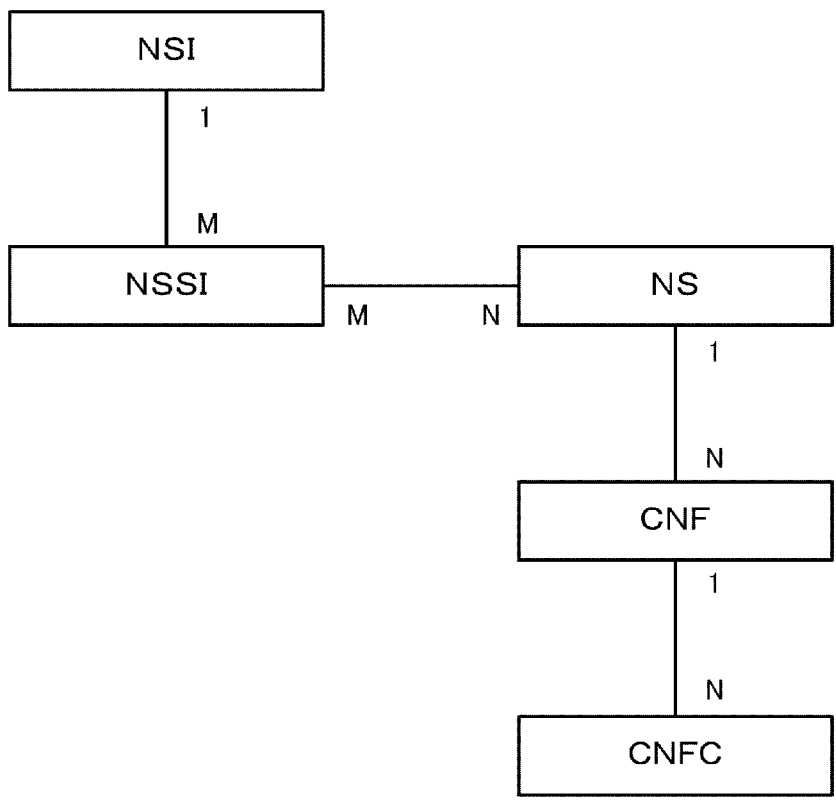
FIG. 7 is a diagram illustrating a hierarchical structure of a plurality of types of network elements.

FIG. 7 is a diagram illustrating a hierarchical structure of the plurality of types of network elements. A relationship between the NSI and the NSSI is a one-to-many relationship, and a relationship between the NSSI and the NS is a many-to-many relationship. A relationship between the NS and the CNF is a one-to-many relationship, and a relationship between the CNF and the CNFC is also a one-to-many relationship. Hereinafter, data showing the hierarchical structure of the plurality of types of network elements is also referred to as a "network hierarchical data". The network hierarchical data includes data showing a correspondence relationship between at least one NSI and a plurality of NSSIs, data showing a correspondence relationship between the plurality of NSSIs and a plurality of NSs, data showing a correspondence relationship between the plurality of NSs and a plurality of CNFs, and data showing a correspondence relationship between the plurality of CNFs and a plurality of CNFCs.

Figure 8:
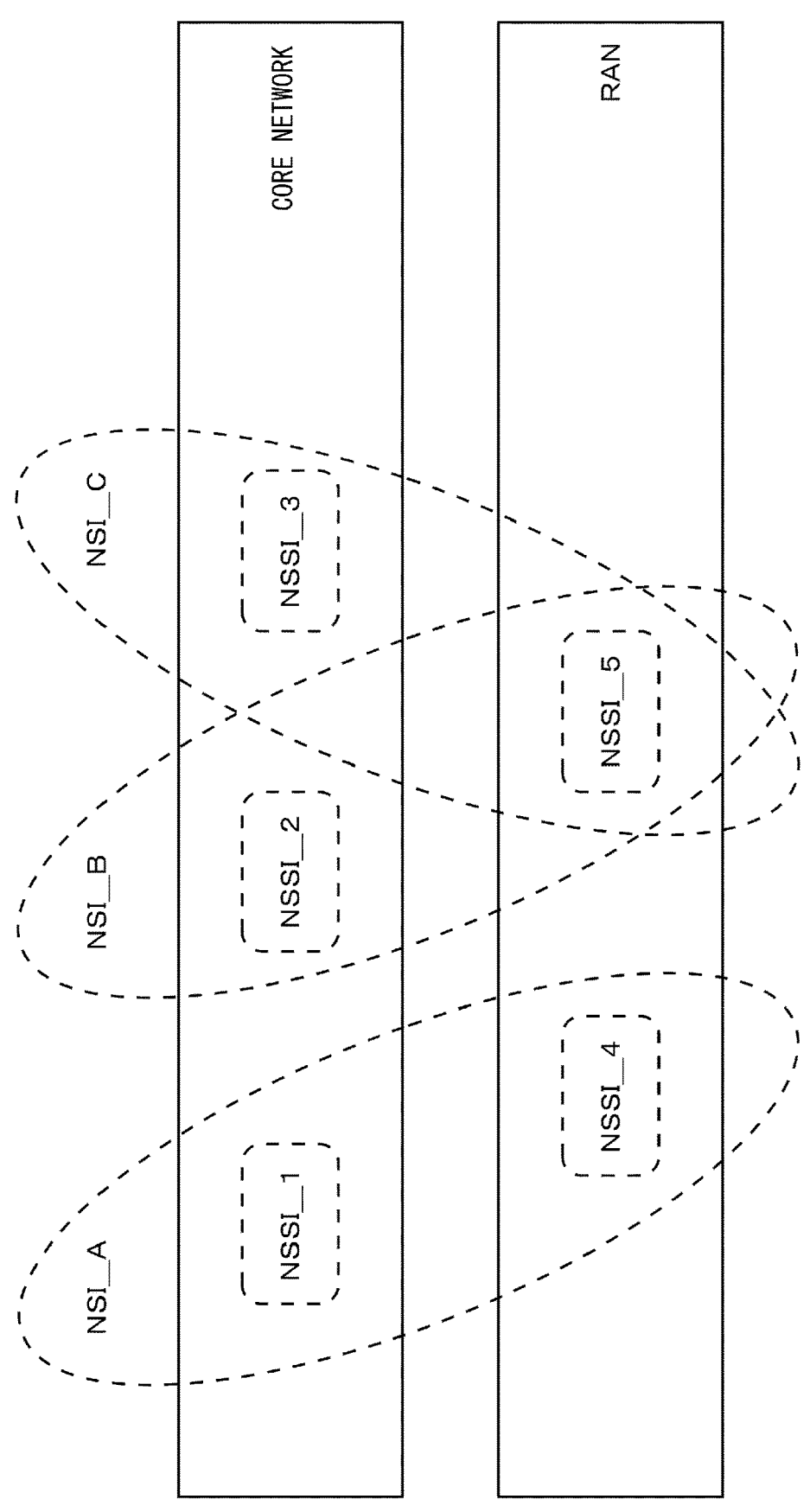
FIG. 8 is a diagram illustrating examples of an NSI and an NSSI.

FIG. 8 illustrates examples of the NSI and the NSSI. The NSI can also be said to be an end-to-end virtual circuit provided across a plurality of domains (for example, from the RAN to the core network). The NSI may be a slice for high-speed, large-capacity communications, a slice for high-reliability and low-delay communications, or a slice for connections between a number of terminals. The NSSI can also be said to be a virtual circuit in a single domain obtained by dividing the NSI. The NSSI may be a slice of a RAN

8 domain, a slice of a mobile back haul (MBH) domain, or a slice of a core network domain. Further, as illustrated in FIG. 8, a plurality of NSIs may share the same NSSI.

The NS may be a 5G core network (5GC), a 4G core network (EPC), a 5G RAN, or a 4G RAN. The CNF may correspond to a plurality of types of network functions on the 5G core network, and may be, for example, an AMF, an SMF, or a UPF. Further, the CNF may correspond to a plurality of types of network functions on the 4G core network, and may be, for example, a mobility management entity (MME), a home subscriber server (HSS), or a serving gateway (S-GW).

The CNFC may be a microservice deployed to a server as at least one container. For example, a CNFC may be a microservice that provides some of the functions of an eNodeB (that is, an LTE base station) or a gNB (that is, a 5G base station). Further, another CNFC may be a microservice that provides some of the core network functions such as an AMF or an MME.

Returning to FIG. 6, the security section data shows, for example, a security definition of the network service such as installation credentials.

The operation section data shows, for example, a monitoring policy for the network service such as a metric of the monitoring target and the monitoring interval.

Figure 9:
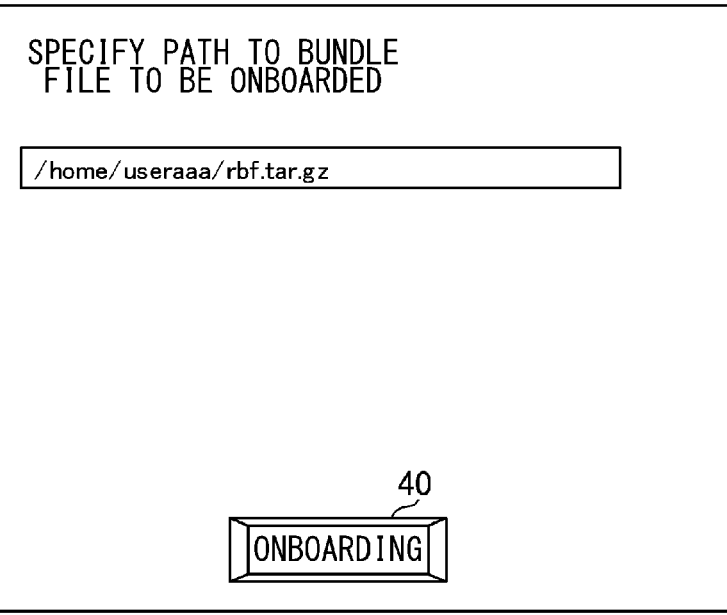
FIG. 9 is a diagram illustrating an example of an onboarding screen.

FIG. 9 is a diagram illustrating an example of an onboarding screen displayed on the vendor terminal 16 according to the present embodiment. According to the present embodiment, when the vendor specifies a path to the bundle file and then clicks on an Onboarding button 40, the bundle file is onboarded.

As described above, according to the present embodiment, the vendor can easily onboard the network service without being aware of the actual location where the created file group is onboarded.

Hereinafter, functions of the MPS 10 and the NOS 12 according to the present embodiment and processing performed by the MPS 10 and the NOS 12 will be further described.

Figure 10:
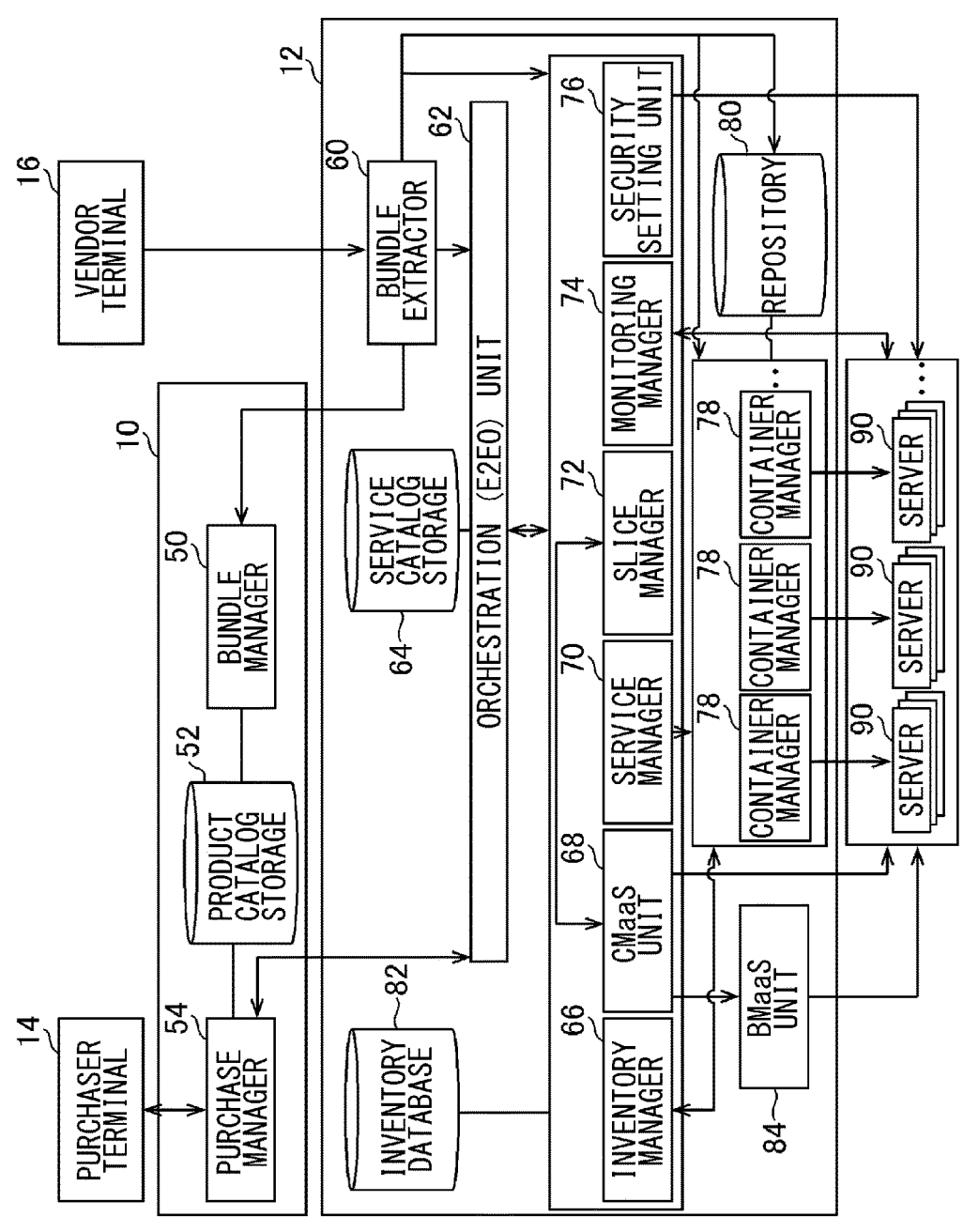
FIG. 10 is a functional block diagram illustrating examples of functions implemented in an MPS and an NOS according to the underlying technology.

FIG. 10 is a functional block diagram illustrating examples of functions implemented by the MPS 10 and the NOS 12 according to the present embodiment. The plurality of functional blocks illustrated in the block diagrams of the present specification may be implemented, in terms of hardware, by a circuit block, a memory, and other LSI and implemented, in terms of software, by a program loaded on the memory and executed by a CPU. Therefore, it is to be understood by those skilled in the art that these functional blocks may be implemented in various forms such as hardware only, software only, or a combination of hardware and software. Note that, in the MPS 10 and the NOS 12 according to the present embodiment, it is not necessary to implement all the functions illustrated in FIG. 10, and functions other than the functions illustrated in FIG. 10 may be implemented.

As illustrated in FIG. 10, the MPS 10 functionally includes, for example, a bundle manager 50, a product catalog storage 52, and a purchase manager 54.

The bundle manager 50 and the purchase manager 54 are implemented primarily by the processor 10a and the communication unit 10c. The product catalog storage 52 is implemented primarily by the storage 10b.

The above-described functions may be implemented by a program executed by the processor 10a, the program being installed in the MPS 10 serving as a computer and including instructions corresponding to the above-described functions. This program may be delivered to the MPS 10 via a computer-readable information storage medium such as an optical disc, a magnetic disk, a magnetic tape, a magneto-optical disk, or a flash memory, or over the Internet or the like.

Further, as illustrated in FIG. 10, the NOS 12 functionally includes, for example, a bundle extractor 60, an orchestration (E2EO: End-to-End-Orchestration) unit 62, a service catalog storage 64, an inventory manager 66, a configuration management as a service (CMaaS) unit 68, a service manager 70, a slice manager 72, a monitoring manager 74, a security setting unit 76, a plurality of container managers 78, a repository 80, an inventory database 82, and a bare metal as a service (BMaaS) unit 84.

The bundle extractor 60 and the E2EO unit 62 are implemented primarily by the processor 12a and the communication unit 12c. The service catalog storage 64, the repository 80, and the inventory database 82 are implemented primarily by the storage 12b. The inventory manager 66, the CMaaS unit 68, the service manager 70, the slice manager 72, the monitoring manager 74, the security setting unit 76, and the container manager 78 are implemented primarily by the processor 12a and the storage 12b. The BMaaS unit 84 is implemented primarily by the processor 12a.

The above-described functions may be implemented by a program executed by the processor 12a, the program being installed in the NOS 12 serving as a computer and including instructions corresponding to the above-described functions. This program may be delivered to the NOS 12 via a computer-readable information storage medium such as an optical disc, a magnetic disk, a magnetic tape, a magneto-optical disk, or a flash memory, or over the Internet or the like.

Further, FIG. 10 also illustrates the plurality of servers 90 that belong to the core network system 20 and the base station device 22 illustrated in FIG. 1 and are placed at various locations in a distributed manner. Then, the plurality of container managers 78 according to the present embodiment are each associated with a server group including some of the plurality of servers 90.

For example, a container management tool such as Kubernetes and a package manager such as Helm are installed in each of the plurality of container managers 78 according to the present embodiment. Then, the container manager 78 performs container life-cycle management including construction of a container such as settings of the container and deployment of the container to the server group (the plurality of servers 90) associated with the container manager 78.

Note that the container manager 78 need not be included in the NOS 12. The container manager 78 may be provided in, for example, a server 90 (that is, the core network system 20 or the base station device 22) managed by the container manager 78 or a server provided together with the server 90.

According to the present embodiment, for example, the bundle extractor 60 receives a bundle file from the vendor terminal 16. Then, according to the present embodiment, for example, the bundle extractor 60 creates a data group whose data structure is illustrated in FIG. 11 on the basis of the bundle file thus received. The data group illustrated in FIG. 11 is obtained by recompiling the content of the bundle file received by the bundle extractor 60.

As illustrated in FIG. 11, the data group created by the bundle extractor 60 includes product catalog data, service catalog data, inventory template data, CM template data, service template data, slice template data, monitoring script data, security script data, helm chart data, and container image data.

The product catalog data is, for example, data corresponding to the business section data included in the bundle file. As described above, the product catalog data shows information on the business requirements of the network service, such as the name of the network service, the license requirement, and the definition of the service level agreement (SLA) displayed on the purchase screen illustrated in FIG. 2.

Further, the product catalog data according to the present embodiment includes data showing required input items and optional input items for the service requirements of the network service. According to the present embodiment, for example, the purchase screen illustrated in FIG. 2 and the service requirement input screen illustrated in FIG. 3 are created on the basis of the product catalog data.

The service catalog data is, for example, data corresponding to some of the technology section data included in the bundle file. The service catalog data includes a script of a workflow for constructing the network service.

The service catalog data may further include requirement configuration correspondence data showing correspondence between the value of the service requirement data and the configuration of the functional unit group (for example, the CNFC group) constructed in response to the purchase request.

For example, the service catalog data may include requirement configuration correspondence data showing correspondence between the value of the service requirement data and the type of the functional unit group and the number of functional units for each type. For example, the requirement configuration correspondence data may show correspondences between "the number of subscribers 20,000 and one packet data network gateway (P-GW)", between "the number of subscribers 20,000 and one IP multimedia system (IMS)", and between "the number of subscribers 20,000 and one home subscriber server (HSS)". Note that data associated with the service requirement data is not limited to the type and number of 4G components, and the service requirement data may be associated with the type and number of 5G components.

Further, for example, the requirement configuration correspondence data may show correspondence between the value of the service requirement data and the location where each functional unit included in the functional unit group constructed in response to the purchase request is constructed. In this case, the location associated with the value of the service requirement data in the requirement configuration correspondence data may differ in a manner that depends on the functional unit included in the functional unit group to be constructed.

The inventory template data is, for example, data corresponding to some of the technology section data and some of the security section data included in the bundle file. The inventory template data is, for example, template data showing logic used by the inventory manager 66.

The CM template data is, for example, data corresponding to some of the technology section data and some of the operation section data included in the bundle file, and is, for example, template data showing logic used by the CMaaS unit 68.

The service template data is, for example, data corresponding to some of the technology section data included in the bundle file, and is, for example, template data showing logic used by the service manager 70. The service template data includes information necessary for the service manager 70 to construct the network service. Specifically, the service template data includes information defining at least an NS, a CNF, and a CNFC to be constructed by the service manager 70 and information showing a correspondence relationship among the NS-CNF-CNFC, of the network hierarchical data illustrated in FIG. 7.

The slice template data is, for example, data corresponding to some of the technology section data included in the bundle file, and is, for example, template data showing logic used by the slice manager 72.

The slice template data includes information of "Generic Network Slice Template" defined by GSM Association (GSMA) ("GSM" is a registered trademark). Specifically, the slice template data includes network slice template data (NST), network slice subnet template data (NSST), and network service template data, and further includes information (for example, the above-described network hierarchical data) showing a hierarchical structure of such network elements. The NST and the NSST include SLA information on a network slice instance (NSI) and a network slice subnet instance (NSSI).

The above-described SLA information includes at least one key performance indicator (KPI) for the NSI and the NSSI based on the metric data of the monitoring target, and calculation logic for calculating each KPI. Further, the SLA information includes information on a threshold to be used during monitoring and a threshold (for example, an abnormality detection threshold) to be compared with the calculated KPI.

The monitoring script data is, for example, data corresponding to some of the operation section data included in the bundle file, and is, for example, data showing a monitoring script to be executed by the monitoring manager 74.

The security script data is, for example, data corresponding to some of the security section data included in the bundle file, and is, for example, data showing a security script to be executed by the security setting unit 76.

The helm chart data is, for example, data corresponding to some of the operation section data included in the bundle file, and is data showing a script template (helm chart) to be used by the container manager 78.

The container image data is, for example, data corresponding to some of the operation section data included in the bundle file, and is, for example, container image data on a container included in the functional unit group via which the network service is implemented. The container image data includes one or more container images. The one or more container images are each associated with a container image ID that is an identifier of the container image.

According to the present embodiment, the bundle extractor 60 determines, upon receipt of the bundle file, a bundle ID corresponding to a data group created on the basis of the bundle file. The bundle ID is uniquely assigned to each created data group.

Then, the bundle extractor 60 transmits the product catalog data included in the data group corresponding to the bundle ID to the MPS 10 with the product catalog data associated with the determined bundle ID.

Further, the bundle extractor 60 outputs the service catalog data included in the data group to the E2EO unit 62 with the service catalog data associated with the determined bundle ID. Then, the E2EO unit 62 stores the service catalog data into the service catalog storage 64.

Further, the bundle extractor 60 stores the inventory template data, the CM template data, the service template data, the slice template data, the monitoring script data, the security script data, the helm chart data, and the container image data into the inventory manager 66, the CMaaS unit 68, the service manager 70, the slice manager 72, the monitoring manager 74, the security setting unit 76, the container manager 78, and the repository 80, respectively, with the data group associated with a corresponding bundle ID.

As described above, according to the present embodiment, the bundle ID causes the product catalog data, the service catalog data, the inventory template data, the CM template data, the service template data, the slice template data, the monitoring script data, the security script data, the helm chart data, and the container image data to be associated with each other.

Further, according to the present embodiment, the vendor can easily provide a network service in a simple manner such as by specifying the path to the bundle file.

According to the present embodiment, for example, the bundle manager 50 receives the product catalog data associated with the bundle ID from the bundle extractor 60. Then, the bundle manager 50 stores the product catalog data thus received into the product catalog storage 52.

According to the present embodiment, for example, the product catalog storage 52 stores the product catalog data associated with the bundle ID as described above.

According to the present embodiment, for example, the purchase manager 54 receives, from the purchaser terminal 14, a network service construction request such as a network service purchase request associated with the bundle ID and the service requirement data. Hereinafter, the bundle ID associated with the purchase request is referred to as a purchase bundle ID, and the service requirement data associated with the purchase request is referred to as purchase service requirement data.

Then, upon receipt of the purchase request, the purchase manager 54 transmits, to the E2EO unit 62, the purchase service requirement data associated with the purchase bundle ID.

Further, the purchase manager 54 specifies a delivery time of the network service to be purchased by the purchaser in cooperation with the E2EO unit 62 and the inventory manager 66. Then, the purchase manager 54 notifies the purchaser of the delivery time thus specified. For example, the purchase manager 54 create a purchase confirmation screen showing the specified delivery time and transmits the purchase confirmation screen thus created to the purchaser terminal 14.

According to the present embodiment, for example, the inventory database 82 is a database that is managed by the NOS 12 and stores inventory information on the plurality of servers 90 placed in the core network system 20 or the base station device 22.

Figure 13:
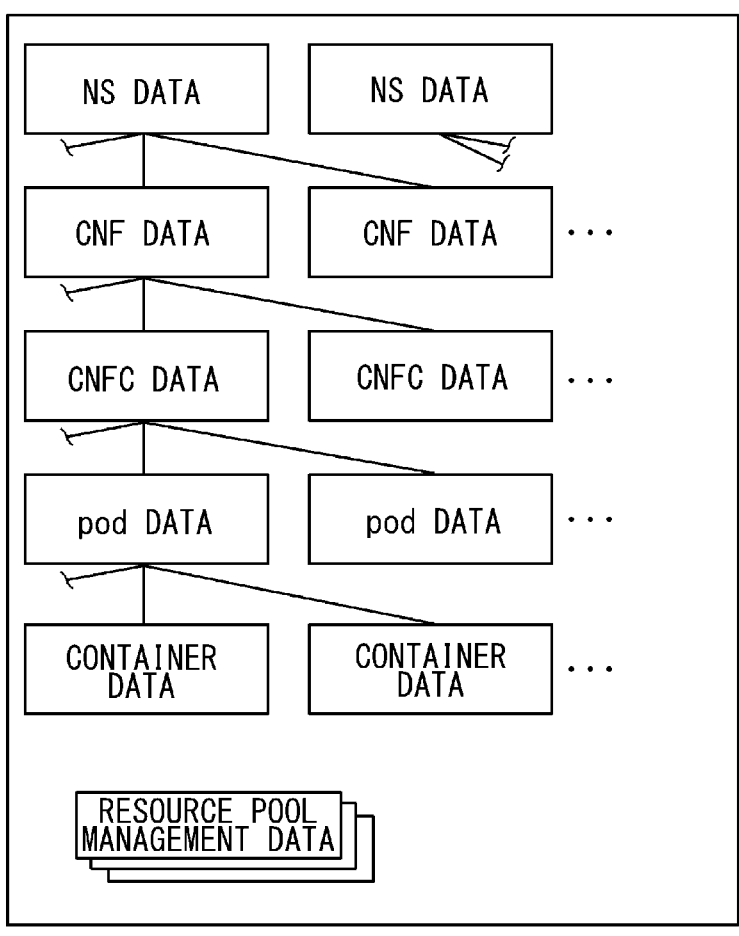
FIG. 13 is a diagram schematically illustrating an example of a data structure of logical inventory data.

According to the present embodiment, for example, the inventory database 82 stores inventory data including physical inventory data illustrated in FIG. 12 and logical inventory data illustrated in FIG. 13. The inventory data shows the status of resources managed by the NOS 12 (for example, resource usage status).

FIG. 12 is a diagram illustrating an example of a data structure of the physical inventory data. The physical inventory data illustrated in FIG. 12 is associated with one server 90. The physical inventory data illustrated in FIG. 12 includes, for example, a server ID, location data, building data, floor number data, rack data, an allocated resource pool group ID, an allocated resource pool ID, specification data, network data, an active container ID list, and the like.

The server ID included in the physical inventory data is, for example, an identifier of the server 90 associated with the physical inventory data.

The location data included in the physical inventory data is, for example, data showing a location (for example, a location address) of the server 90 associated with the physical inventory data.

The building data included in the physical inventory data is, for example, data showing a building (for example, a building name) where the server 90 associated with the physical inventory data is placed.

The floor number data included in the physical inventory data is, for example, data showing a floor number where the server 90 associated with the physical inventory data is placed.

The rack data included in the physical inventory data is, for example, an identifier of a rack where the server 90 associated with the physical inventory data is placed.

The allocated resource pool group ID included in the physical inventory data is, for example, an identifier of a resource pool group allocated to the server 90 associated with the physical inventory data.

The allocated resource pool ID included in the physical inventory data is, for example, an identifier of a resource pool allocated to the server 90 associated with the physical inventory data. The resource pool indicated by the allocated resource pool ID is any resource pool included in the resource pool group associated with the allocated resource pool group ID. According to the present embodiment, an available server is allocated to any resource pool group, but to which resource pool included in the resource pool group the available server is allocated has not yet been determined. For such an available server, Null is set as the value of the allocated resource pool ID included in the associated physical inventory data.

The specification data included in the physical inventory data is, for example, data showing a specification of the server 90, such as the number of cores, a memory capacity, and a hard disk capacity of the server 90 associated with the physical inventory data.

The network data included in the physical inventory data is, for example, data showing an NIC included in the server 90 associated with the physical inventory data, the number of ports of the NIC, and the like.

The active container ID list included in the physical inventory data is, for example, data showing a list of identifiers (container IDs) of instances of one or more containers running on the server 90 associated with the physical inventory data.

FIG. 13 is a diagram schematically illustrating an example of a data structure of the logical inventory data. As illustrated in FIG. 13, the logical inventory data includes network service (NS) data, cloud-native network function (CNF) data, CNFC data, pod data, and container data.

The NS data is, for example, data showing attributes such as an identifier of an instance of a network service corresponding to a virtual RAN (vRAN) or the like and a type of the network service. The CNF data is, for example, data showing attributes such as an identifier of an instance of a network function corresponding to an eNodeB or the like and a type of the network function. The CNFC data is, for example, data showing attributes such as an identifier of an instance of a CNFC corresponding to a vCU or a vDU, and a type of the CNFC. The pod data is data showing attributes such as an identifier of an instance of a pod included in the CNFC and a type of the pod. Here, the pod refers to a minimum unit for managing a docker container under Kubernetes. The container data is data showing attributes such as a container ID of an instance of a container included in the pod and a type of the container.

Note that data showing attributes such as a host name or an IP address may be set in the above-described data included in the logical inventory data. For example, the container data may include data showing the IP address of the container corresponding to the container data. Further, for example, the CNFC data may include data showing the IP address and the host name of the CNFC shown by the CNFC data.

The above-described data has a hierarchical structure, and the NS data is associated with one or more pieces of CNF data corresponding to one of one or more network functions included in the network service corresponding to the NS data. Further, the CNF data is associated with one or more pieces of CNFC data corresponding to one or more CNFCs included in the network function corresponding to the CNF data. Further, the CNFC data is associated with one more pieces of pod data corresponding to one or more pods included in the CNFC corresponding to the CNFC data. Further, the pod data is associated with one or more pieces of container data corresponding to one or more containers included in the pod corresponding to the pod data.

The container ID of the container data included in the logical inventory data and the container ID included in the active container ID list included in the physical inventory data associate the instance of the container with the server 90 on which the instance of the container is running.

Note that, according to the present embodiment, the network service purchased by the purchaser (the network service associated with the product catalog data) need not be a network service corresponding to the network service associated with the NS data. For example, the network service purchased by the purchaser may be implemented by a functional unit group corresponding to a network function associated with one or more pieces of CNF data, or may be implemented by a functional unit group associated with one or more pieces of CNFC data. Further, the network service purchased by the purchaser may be implemented by a functional unit group associated with one or more pods, or may be implemented by a functional unit group associated with one or more containers.

Further, as illustrated in FIG. 13, the logical inventory data according to the present embodiment includes a plurality of pieces of resource pool management data each associated with a corresponding resource pool group.

FIG. 14 is a diagram illustrating an example of the resource pool management data according to the present embodiment. The resource pool management data shows a status of a plurality of resource pools included in the resource pool group associated with the resource pool management data.

The resource pool management data illustrated in FIG. 14 includes a resource pool group ID, a plurality of pieces of resource pool data, and available server number data.

The resource pool group ID included in the resource pool management data is an identifier of a resource pool group associated with the resource pool management data.

The available server number data included in the resource pool management data is data showing the number of available servers to which the resource pool group associated with the resource pool management data is allocated.

The resource pool data is data showing a status of a resource pool included in the resource pool group associated with the resource pool management data.

As illustrated in FIG. 14, the resource pool data includes a resource pool ID, total core number data, remaining core number data, and CNFC type data.

The resource pool ID is an identifier of a resource pool.

The total core number data is data showing the total number of cores of the server 90 allocated to the resource pool. The total core number data is a specific example of total resource data showing the total amount of hardware resources included in the resource pool.

The remaining core number data is data showing the number of remaining cores of the server 90 allocated to the resource pool. The remaining core number data is a specific example of remaining resource amount data showing the remaining amount of hardware resources included in the resource pool.

Further, the CNFC type data is data showing a type of at least one CNFC associated with the resource pool. The CNFC type data is a specific example of functional unit type data showing a type of at least one functional unit associated with the resource pool.

According to the present embodiment, a resource pool group distributed over a plurality of locations may be preset, or a resource pool group associated with only one location may be preset. In any case, the resource pool group is associated with one or more locations shown by the physical inventory data.

Further, the inventory manager 66 can appropriately grasp the status of resources in cooperation with the container manager 78. Then, the inventory manager 66 appropriately updates the inventory data stored in the inventory database 82 on the basis of the latest status of resources.

According to the present embodiment, for example, the E2EO unit 62 and the inventory manager 66 specifies the configuration of the functional unit group via which the network service to be purchased is implemented on the basis of the service requirement data received from the purchase manager 54.

Here, for example, the E2EO unit 62 retrieves, from the service catalog storage 64, the service catalog data corresponding to the purchase bundle ID associated with the purchase service requirement data received from the purchase manager 54. Then, the E2EO unit 62 executes a script of a workflow shown by the service catalog data.

The E2EO unit 62 and the inventory manager 66 creates planned data illustrated in FIGS. 15 and 16 on the basis of the purchase service requirement data received from the purchase manager 54, the service catalog data associated with the purchase bundle ID, the inventory template data associated with the purchase bundle ID, and the inventory data. The planned data is, for example, data showing a configuration of a functional unit group via which the network service to be purchased is implemented. This process is performed, for example, with execution of the script of the workflow by the E2EO unit 62 as a trigger.

FIG. 15 is a diagram illustrating an example of a data structure of the planned data according to the present embodiment. FIG. 16 is a diagram schematically illustrating an example of the planned data according to the present embodiment. The planned data according to the present embodiment includes an inventory key that is an identifier of the planned data. When the planned data is created, the inventory key is uniquely assigned to the planned data. The planned data further includes a purchase bundle ID ("0010" in the example illustrated in FIG. 16). The planned data further includes a user ID that is an identifier of a purchaser (user) who has made a purchase request.

The planned data may further include values set in the purchase service requirement data. The planned data illustrated in FIGS. 15 and 16 includes a value of facing IP data, a value of monitoring target data, a value of monitoring interval data, and a value of password data included in the purchase service requirement data.

According to the present embodiment, the planned data includes functional unit configuration data on each functional unit included in the functional unit group via which the network service to be purchased is implemented. The functional unit configuration data includes, for example, CNFC type data showing a type of the functional unit, host name data showing a host name, IP address data showing an IP address, and a plurality of pieces of container configuration data each associated with a corresponding container constituting the functional unit.

Here, for example, the E2EO unit 62 may specify the number of functional unit groups to be constructed on the basis of the purchase service requirement data. For example, the E2EO unit 62 may specify types of functional unit groups via which the network service to be purchased is implemented and the number of functional units for each type on the basis of the purchase service requirement data and the requirement configuration correspondence data included in the service catalog data. For example, when the number of subscribers shown by the service requirement data is 50,000, the functional unit groups to be constructed may be determined to be three P-GWs, three IMSs, and three HSSs on the basis of the above-described requirement configuration correspondence data.

Then, the E2EO unit 62 may output, to the inventory manager 66, data showing the types of functional unit groups and the number of functional units for each type together with the service requirement data. Then, the inventory manager 66 may determine the host name and the IP address assigned to each functional unit on the basis of the data and the inventory data. Here, for example, the host name and the IP address may be determined so as not to coincide with host names and IP addresses that are already in use. Then, planned data including host name data showing the host name thus determined and IP address data showing the IP address thus determined may be created.

As described above, the E2EO unit 62 may specify a location where each functional unit included in the functional unit group to be constructed is constructed on the basis of the purchase service requirement data. For example, the E2EO unit 62 may determine the location of each functional unit included in the functional unit group to be constructed on the basis of the target area data included in the purchase service requirement data and the requirement configuration correspondence data included in the service catalog data. Here, the locations of the functional units thus determined may be different from each other. For each functional unit, a host name or an IP address available at the location determined for the functional unit may be determined to be the host name or the IP address of the functional unit. Then, planned data including host name data showing the host name thus determined and IP address data showing the IP address thus determined may be created.

Further, the E2EO unit 62 may specify the type and number of functional units constructed at each of the plurality of locations on the basis of the purchase service requirement data. In this case, the E2EO unit 62 may determine, in accordance with the location specified on the basis of the purchase service requirement data, the number of functional units of each type constructed at the location. Further, the E2EO unit 62 may determine the number of functional units of each type constructed at each location on the basis of a weight set for each location specified on the basis of the purchase service requirement data.

For example, estimated busy level data illustrated in FIG. 17 may be stored in the E2EO unit 62. The estimated busy level data illustrated in FIG. 17 shows, for example, the population of an area covered by one or more cells under the control of a data center associated with the estimated busy level data. A value of the estimated busy level data is an example of the above-described weight set for each location.

Here, estimated busy level data on a data center of a core network system 20 shows, for example, the population of an area covered by a cell of one or more base station devices 22 communicating with the core network system 20.

Then, for example, a larger number of functional units may be deployed to a location with a higher population shown by the estimated busy level data. For example, it is assumed that the total number n of vDUs to be deployed is specified on the basis of the subscriber number data included in the purchase service requirement data. Then, on the basis of the target area data included in the purchase service requirement data, a plurality of data centers to which the vDUs are deployed within the target area shown by the target area data are specified. In this case, on the basis of the value of the estimated busy level data for each data center thus specified, the number of vDUs obtained by proportionally dividing the total number n of the vDUs thus specified may be deployed to each data center.

As illustrated in FIG. 15, the container configuration data includes, for example, a container ID, a container image ID, required resource data, a resource pool group ID, a resource pool ID, and a connection container ID list.

The container ID is, for example, an identifier uniquely assigned to an instance of a container corresponding to the container configuration data as described above.

For example, as the container image ID included in the container configuration data, a container image ID assigned to a container image of a container corresponding to the container configuration data is set.

The required resource data is, for example, data showing a resource required for running the container. According to the present embodiment, for example, the inventory template data shows, for each container, a resource required for running the container. The inventory manager 66 sets a value of the required resource data on the basis of the inventory template data.

For example, as the resource pool group ID included in the container configuration data, a value of a resource pool group ID of a resource pool group allocated to a container corresponding to the container configuration data is set. For example, the inventory manager 66 may determine the resource pool group ID on which the container is constructed on the basis of the location determined as described above and the inventory data.

For example, as the resource pool ID included in the container configuration data, a value of a resource pool ID of a resource pool allocated to a container corresponding to the container configuration data is set. For example, the inventory manager 66 may determine the resource pool ID on the basis of the type of the container and the resource pool management data.

The connection container ID list is a list of container IDs of containers connected to the container. According to the present embodiment, for example, the inventory template data shows, for each container, a type of a container connected to the container. The inventory manager 66 determines a value of the connection container ID list on the basis of, for example, the inventory template data and the inventory data.

When creating planned data, the E2EO unit 62 specifies a resource pool to which a new functional unit group is deployed and required resources in cooperation with the inventory manager 66. Here, the E2EO unit 62 may specify a resource pool associated with a functional unit specified upon receipt of the network service construction request such as the purchase request. Further, the E2EO unit 62 may specify a resource pool group on the basis of the target area of the network service to be purchased. For example, the resource pool group may be specified on the basis of the target area shown by the target area data included in the purchase service requirement data. Then, the E2EO unit 62 may specify a resource pool to which a new functional unit group is deployed from the resource pools included in the resource pool group thus specified.

Further, the E2EO unit 62 determines whether a hardware resource (for example, a server 90) to which a new functional unit group is deployed can be allocated. Specifically, a determination is made as to whether (1) a server 90 can be allocated, (2) a server 90 can be allocated when an unused hardware resource (for example, an available server) not included in any resource pool is set up, or (3) no server 90 can be allocated.

Here, in the case of (2), the E2EO unit 62 determines whether a predetermined specific type of functional unit is deployed to the unused hardware resource (for example, an available server).

Then, when the specific type of functional unit is deployed, the E2EO unit 62 specifies a resource pool associated with the specific type of functional unit. Here, for example, the resource pool is specified on the basis of the resource pool management data.

According to the present embodiment, for example, the resource pool group ID of the resource pool group specified as described above and the resource pool ID of the specified resource pool are set in the container configuration data.

According to the present embodiment, the CMaaS unit 68, the service manager 70, and the slice manager 72 specifies a procedure of constructing the functional unit group on the basis of, for example, the configuration of the functional unit group specified as described above and template data that can accept the configuration as a parameter. The construction procedure includes, for example, a procedure of configuring and managing a container such as deploying the container and setting the container thus deployed and a container related to the deployed container. This process is performed, for example, with execution of the script of the workflow by the E2EO unit 62 as a trigger.

Then, the CMaaS unit 68, the service manager 70, the slice manager 72, and the container manager 78 construct a functional unit group by performing the specified construction procedure. This process is also performed, for example, with execution of the script of the workflow by the E2EO unit 62 as a trigger.

Note that the functional units included in the functional unit group may be each constructed at a location specified for the functional unit.

Further, for example, a number of functional unit groups specified on the basis of the purchase service requirement data may be constructed.

Further, for example, for each of the plurality of locations, a specified number of functional units of a type specified for the location may be constructed.

Here, the CMaaS unit 68 and the BMaaS unit 84 allocate, for example, a hardware resource (for example, a server 90) to which a new functional unit group is deployed.

Further, the CMaaS unit 68 and the BMaaS unit 84 perform a setup of system software corresponding to a specific type of functional unit on an unused hardware resource. According to the present embodiment, for example, a script (for example, an Ansible script) for setting up the above-described specific type of functional unit is stored in the CMaaS unit 68 or the BMaaS unit 84. The script describes, for example, a procedure of installing the host OS, which is a base of the container execution environment, a procedure of configuring a kernel of the host OS, a procedure of configuring a basic input output system (BIOS), and the like, which are of a specific type or a specific version. Then, the BMaaS unit 84 executes the script to perform the setup of system software corresponding to the specific type of functional unit on the available server. Specifically, a setup of the host OS or BIOS of the container execution environment is performed on the available server.

Then, the CMaaS unit 68 and the BMaaS unit 84 update the resource pool management data to add the unused hardware resource having system software set up to the specified resource pool. Such addition of the hardware resource to the resource pool is detected by the container manager 78 that manages the hardware resource. Then, the inventory manager 66 updates inventory data corresponding to the hardware resource (server 90) thus added. This causes the hardware resource having system software corresponding to the specific type of functional unit set up to belong to the resource pool.

Here, for example, it is assumed that the vDU is a specific type of functional unit. Further, it is assumed that the number of cores required for the vDU is 5, and the number of cores of the available server is 50.

In this case, when the network service including the vDU is purchased, a resource pool associated with the vDU is specified. In the example illustrated FIG. 14, a resource pool whose resource pool ID is C is specified. Then, it is confirmed whether the remaining hardware resource of the resource pool is sufficient. Then, when the remaining hardware resource is not sufficient, the setup of system software corresponding to the vDU is performed on one available server. Then, the server 90 having system software set up is added to the resource pool C, and the resource pool management data is updated as illustrated in FIG. 18.

As described above, according to the present embodiment, the hardware resource included in the resource pool corresponding to the resource pool data is subjected to the setup of system software corresponding to at least one type of functional unit associated with the resource pool.

Some types of functional units may prevent a general-purpose server having a general configuration from exhibiting sufficient performance. It is therefore desirable that the setup of system software such as a host OS or a BIOS that is unique to such a specific type of functional unit be performed on a hardware resource such as a server. In this case, it is conceivable that a required number of hardware resources subjected to such a unique setup of system software are prepared in advance before the start of providing the network service, and the functional unit is deployed, when necessary, to the hardware resources thus prepared.

It is, however, difficult to estimate an optimum amount of hardware resources to be subjected to the setup of system software corresponding to the specific type of functional unit before the start of providing the network service. Further, when the setup of system software corresponding to the specific type of functional unit is performed on many hardware resources with a margin, such hardware resources are not suitable for deployment of other functional units and thus become a waste.

According to the present embodiment, as described above, when the specific type of functional unit is deployed to an unused hardware resource, the setup of system software corresponding to the specific type of functional unit is performed on the unused hardware resource. Then, the unused hardware resource having system software set up is added to the resource pool associated with the specific type of functional unit.

As described above, according to the present embodiment, it is possible to effectively use hardware resources to which various functional units via which the network service is implemented are deployed.

Note that, according to the present embodiment, a functional unit may be specified on the basis of a result of demand prediction. For example, a functional unit predicted to be insufficient in the near future may be specified on the basis of the result of demand prediction. Then, a resource pool associated with the functional unit thus specified may be specified. Then, an unused hardware resource having system software corresponding to the functional unit set up may be added to the resource pool.

When a hardware resource to which a new functional unit group is deployed is allocated, the service manager 70 instructs the container manager 78 to deploy the new functional unit group on the basis of, for example, the above-described planned data and the service template data that is associated with the purchase bundle ID and is stored in the service manager 70. The service template data can accept some or all of the planned data as a parameter.

Examples of the service template data include a CNFC Descriptor (CNFCD). FIG. 19 is a diagram illustrating an example of the CNFCD. For example, the service manager 70 creates a day0 parameter (CNFC instance) illustrated in FIG. 20 on the basis of the planned data and the CNFCD. For example, the day0 parameter illustrated in FIG. 20 in which values of a host name and an IP address of the CNFCD illustrated in FIG. 19 are set is created.

Here, a template associated with each of a plurality of deployment flavors may be included in the CNFCD. Then, for example, the service manager 70 may create the day0 parameter on the basis of a template corresponding to a deployment flavor based on the purchase service requirement data.

Here, the service manager 70 may specify a location of an output destination of the day0 parameter. For example, one or more container managers 78 to be the output destination of the day0 parameter may be specified. For example, a container manager 78 associated with a server 90 placed at the location of the resource pool shown by the container configuration data of the planned data may be specified. Then, the day0 parameter output to each of the specified locations may be created. For example, the day0 parameter output to each of one or more container managers 78 corresponding to the output destination may be created.

Then, the service manager 70 outputs each of one or more day0 parameters thus created to the container manager 78 corresponding to the location of the output destination of the day0 parameter. The purchase bundle ID is associated with the day0 parameter.

Then, the container manager 78 deploys a new functional unit group on the basis of the received day0 parameter. For example, the container manager 78 specifies a container image to be deployed and a resource pool to which the container is deployed on the basis of helm chart data associated with the purchase bundle ID and the received day0 parameter. Then, the container manager 78 retrieves the container image from the repository 80 and deploys a container corresponding to the container image to the specified resource pool. Here, for example, a manifest file is created on the basis of the helm chart data associated with the purchase bundle ID and the received day0 parameter. Then, the deployment of the container is performed in accordance with the manifest file.

Further, the CMaaS unit 68 creates planned CM data including a day1 parameter on the basis of, for example, the above-described planned data and the CM template data that is associated with the purchase bundle ID and is stored in the CMaaS unit 68. The CM template data can accept some or all of the planned data as a parameter.

The day1 parameter shows, for example, a configuration management procedure such as setting of a deployed functional unit group and at least one functional unit related to the functional unit group (for example, a functional unit that communicates with the deployed functional unit group). A day1 parameter for the base station device 22 shows, for example, radio wave intensity, an orientation and an angle of the antenna 22a, a serial number, and the like. A day1 parameter for the serving-gateway (S-GW) shows, for example, information showing a correspondent node (information showing a mobility management entity (MME) of a communication partner, an access point name (APN), or the like), a host name or an FQDN of a remote authentication dial in user service (RADIUS) server, and the like.

Then, the CMaaS unit 68 performs configuration management such as the setting of the functional unit on the basis of the day1 parameter included in the created planned CM data. Such processes are performed with execution of the script of the workflow by the E2EO unit 62 as a trigger, for example.

Then, the slice manager 72 instantiates a network slice related to the network service to be purchased on the basis of, for example, the above-described planned data and the slice template data that is associated with the purchase bundle ID and is stored in the slice manager 72. The slice template data can accept some or all of the planned data as a parameter. This process is performed, for example, with execution of the script of the workflow by the E2EO unit 62 as a trigger.

The slice manager 72 includes a network slice management function (NSMF) and a network slice sub-network management function (NSSMF) described in the 3GPP specification "TS28 533". The NSMF is a function of creating and managing a network slice and provides management of the NSI. The NSSMF is a function of creating and managing a network slice subnet serving as some of a network slice and provides management of the NSSI.

The slice manager 72 may include a storage (not illustrated) that stores information on the NSI and the NSSI. The storage may store a SliceServiceType (SST: MBB, V2X, etc.), an ID of the NSI (NSI ID), an ID of the NSSI (NSSI ID), and an ID of the NS (NS ID).

The slice manager 72 outputs a configuration management instruction related to the instantiation of the network slice and the network slice subnet to the CMaaS unit 68 on the basis of the slice template data. At this time, the slice manager 72 assigns IDs to the NSI and the NSSI to be configured and stores the ID information into the storage. As a modification, the CMaaS unit 68 may assign the IDs to the NSI and the NSSI in accordance with the configuration management instruction received from the slice manager 72 and notify the slice manager 72 of the ID information, and the slice manager 72 may store the ID information notified from the CMaaS unit 68 into the storage. For topology management, the slice manager 72 stores the IDs of the NSI, the NSSI, and the NS associated with each other in the network hierarchical data of the slice template data into the storage with the IDs associated with each other.

Figure 21:
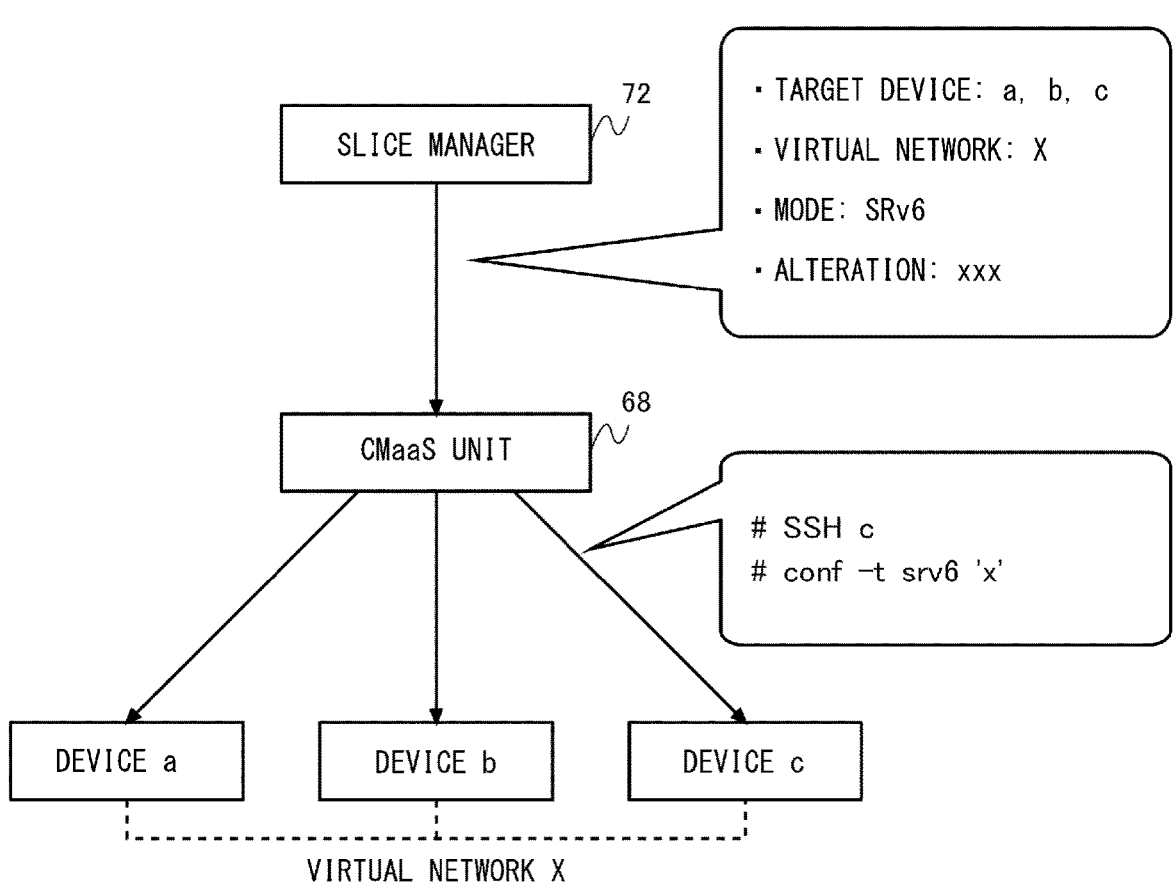
FIG. 21 schematically illustrates a process of constructing an NSI and an NSSI.

Next, a description will be given of an example of the NSI and an example of a process of constructing the NSI. FIG. 21 schematically illustrates a process of constructing the NSI and the NSSI. Devices a to c in FIG. 21 correspond to a plurality of servers 90. The slice manager 72 passes, to the CMaaS unit 68, a configuration management instruction including setting information used for setting the NSI and the NSSI on each device.

The CMaaS unit 68 constructs the NSI and the NSSI on each device using a known segment routing technology (for example, segment routing IPv6 (SRv6)) on the basis of the setting information passed from the slice manager 72. For example, the CMaaS unit 68 may create the NSI and the NSSI across a plurality of setting target CNFCs constructed on the plurality of devices by issuing, to the plurality of setting target CNFCs, a command to set a common virtual local area network (VLAN) and a command to allocate a bandwidth or priority shown by the setting information to the VLAN.

When setting the NSI and the NSSI for the plurality of setting target CNFCs constructed on the plurality of devices, the slice manager 72 further sets a type of metric data and an identification tag to be notified to the monitoring manager 74 for each setting target CNFC. The identification tag is data including a value with which each CNFC can be uniquely identified from the plurality of CNFCs, in other words, data including a value unique to each CNFC.

The slice manager 72 holds SLA information on the NSI and the NSSI included in the slice template data. In the SLA information, KPI calculation logic and a threshold for issuing an alarm are defined. The slice manager 72 specifies, from the management table, a Pod (also referred to as a container or CNFC) associated with the NSI and the NSSI on which KPI calculation is performed, and instructs the monitoring manager 74 to calculate the KPI for each of the NSI and the NSSI on the basis of the metric data output from the Pod.

Here, the slice manager 72 may output a configuration management instruction related to the instantiation of the network slice to the CMaaS unit 68. Then, the CMaaS unit 68 may perform configuration management such as setting in accordance with the configuration management instruction.

Here, for example, the CMaaS unit 68 may perform configuration management related to a new functional unit group when the deployment of the new functional unit group is completed, and then perform configuration management related to the instantiation of the network slice.

Alternatively, the CMaaS unit 68 may update a temporarily created day1 parameter on the basis of the configuration management instruction received from the slice manager 72. Then, the CMaaS unit 68 may collectively perform configuration management related to the new functional unit group and the instantiation of the network slice.

According to the present embodiment, for example, the monitoring manager 74 specifies a monitoring policy shown by the purchase service requirement data on the basis of the above-described planned data and the monitoring script data that is associated with the purchase bundle ID and is stored in the monitoring manager 74. Then, the monitoring manager 74 performs monitoring setting in accordance with the monitoring policy thus specified. Then, the monitoring manager 74 monitors the constructed functional unit group in accordance with the specified monitoring policy. Here, for example, the monitoring target shown by the purchase service requirement data may be monitored at the monitoring intervals shown by the purchase service requirement data. This process is performed, for example, with execution of the script of the workflow by the E2EO unit 62 as a trigger.

For example, the monitoring manager 74 may acquire a log from a sidecar that outputs the value of the metric of the monitoring target associated with the container of the monitoring target as the log at the monitoring intervals. Then, the monitoring manager 74 may accumulate the log. Then, for example, the monitoring manager 74 may transmit the log to the purchaser terminal 14 in response to a request from the purchaser terminal 14.

The monitoring manager 74 acquires the value of the metric of the monitoring target associated with the CNFC (microservice) of the monitoring target using known monitoring software, and calculates the KPI on the basis of the metric value and the predetermined calculation logic. The above-described known monitoring software may be Prometheus. The monitoring manager 74 outputs alert information when the value of the KPI thus calculated exceeds a predetermined threshold or when the value of the KPI is less than the predetermined threshold.

The monitoring manager 74 may calculate KPI values related to the NSI and the NSSI on the basis of an instruction from the slice manager 72. Further, the monitoring manager 74 may calculate KPI values of the NS, the CNF, and the CNFC associated with the NSI and the NSSI in order to calculate the KPI values related to the NSI and the NSSI.

For example, according to the present embodiment, the security setting unit 76 performs security setting such as the setting of a password in accordance with the value of the purchase service requirement data, on the basis of the above-described planned data and the security script data that is associated with the purchase bundle ID and is stored in the security setting unit 76.

Figure 22A:
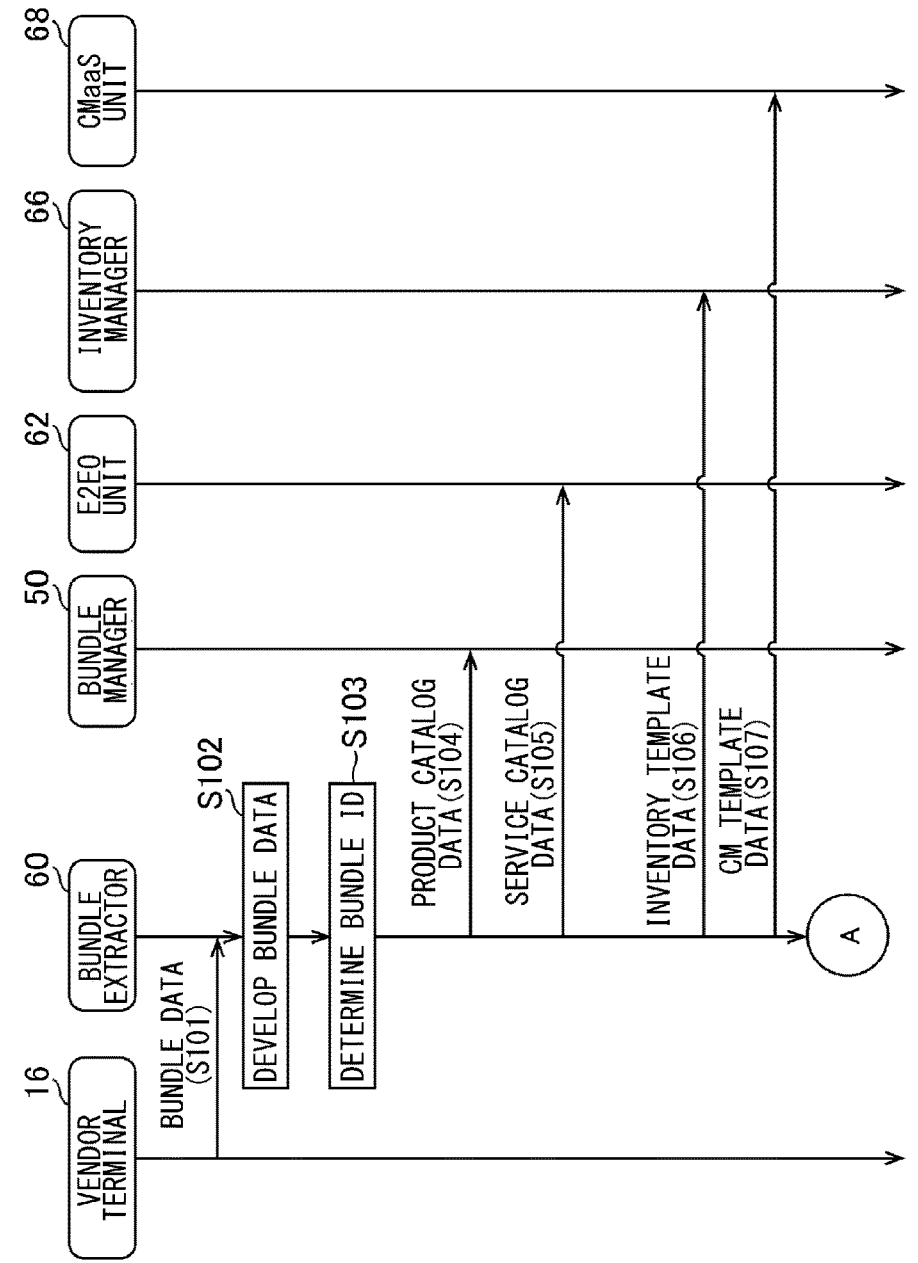
FIG. 22A is a flowchart illustrating an example of a processing flow performed by a vendor terminal, the MPS, and the NOS according to the underlying technology.
Figure 22B:
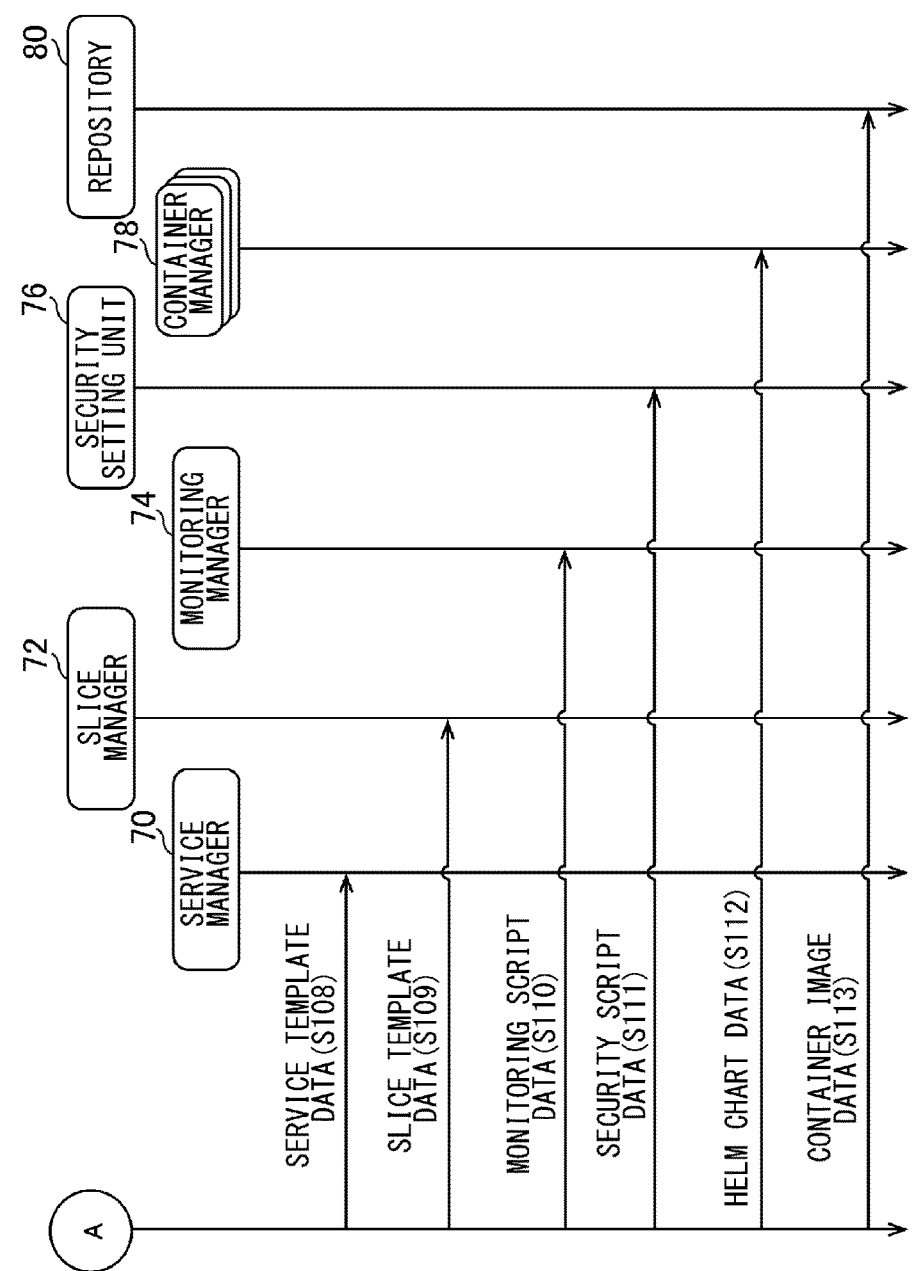
FIG. 22B is a flowchart illustrating an example of a processing flow performed by the vendor terminal, then MPS, and the NOS according to the underlying technology.

Next, a description will be given of a processing flow performed by the vendor terminal 16, the MPS 10, and the NOS 12 when the vendor clicks on the Onboarding button 40 on the onboarding screen illustrated in FIG. 9 with reference to flowcharts illustrated in FIGS. 22A and 22B.

First, the vendor terminal 16 transmits bundle data present in a path specified on the onboarding screen to the bundle extractor 60 of the NOS 12 (S101).

Then, the bundle extractor 60 develops the bundle data received in the process shown in S101 to create a data group illustrated in FIG. 11 (S102).

Then, the bundle extractor 60 determines a bundle ID corresponding to the data group shown in S102 (S103).

Then, the bundle extractor 60 transmits, to the bundle manager 50 of the MPS 10, product catalog data that is included in the data group shown in S102 and is associated with the bundle ID determined in the process shown in S103. Then, the bundle manager 50 of the MPS 10 stores the product catalog data thus received into the product catalog storage 52 (S104).

Then, the bundle extractor 60 outputs, to the E2EO unit 62, service catalog data that is included in the data group shown in S102 and is associated with the bundle ID determined in the process shown in S103. Then, the E2EO unit 62 stores the service catalog data thus received into the service catalog storage 64 (S105).

Then, the bundle extractor 60 causes the inventory manager 66 to store inventory template data that is included in the data group shown in S102 and is associated with the bundle ID determined in the process shown in S103 (S106).

Then, the bundle extractor 60 causes the CMaaS unit 68 to store CM template data that is included in the data group shown in S102 and is associated with the bundle ID determined in the process shown in S103 (S107).

Then, the bundle extractor 60 causes the service manager 70 to store service template data that is included in the data group shown in S102 and is associated with the bundle ID determined in the process shown in S103 (S108).

Then, the bundle extractor 60 causes the slice manager 72 to store slice template data that is included in the data group shown in S102 and is associated with the bundle ID determined in the process shown in S103 (S109).

Then, the bundle extractor 60 causes the monitoring manager 74 to store monitoring script data that is included in the data group shown in S102 and is associated with the bundle ID determined in the process shown in S103 (S110).

Then, the bundle extractor 60 causes the security setting unit 76 to store security script data that is included in the data group shown in S102 and is associated with the bundle ID determined in the process shown in S103 (S111).

Then, the bundle extractor 60 causes the container manager 78 to store helm chart data that is included in the data group shown in S102 and is associated with the bundle ID determined in the process shown in S103 (S112). Here, for example, the bundle extractor 60 may cause a plurality of container managers 78 to store the helm chart included in the data group shown in S102. Further, helm chart data associated with a container manager 78 may be stored into container manager 78.

Then, the bundle extractor 60 causes the repository 80 to store container image data that is included in the data group shown in S102 and is associated with the bundle ID determined in the process shown in S103 (S113), and then the process described in this process example is brought to an end.

Actions taken at the time of onboarding of the bundle data uploaded from the vendor terminal 16 are summarized. The bundle data includes a plurality of types of template data including slice template data and service template data. The bundle extractor 60 receives the bundle data uploaded from the vendor terminal 16, and delivers a plurality of types of template data included in the bundle data to a plurality of functional blocks of the NOS 12 with the plurality of types of template data associated with a service shown by the bundle data. For example, the bundle extractor 60 provides slice template data to the slice manager 72 and service template data to the service manager 70.

In the slice template data, SLA information on an NSI and an NSSI to be provided to the purchaser of the service is described. The SLA information includes a type of KPI to be monitored, calculation logic of the KPI, and a threshold serving as a reference for evaluating the KPI. In the slice template data, a hierarchical structure (correspondence relationship) of NSI-NSSI-NS is further described. In the service template data, types of an NS, a CNF, and a CNFC to be constructed and definition information are described.

Figure 23:
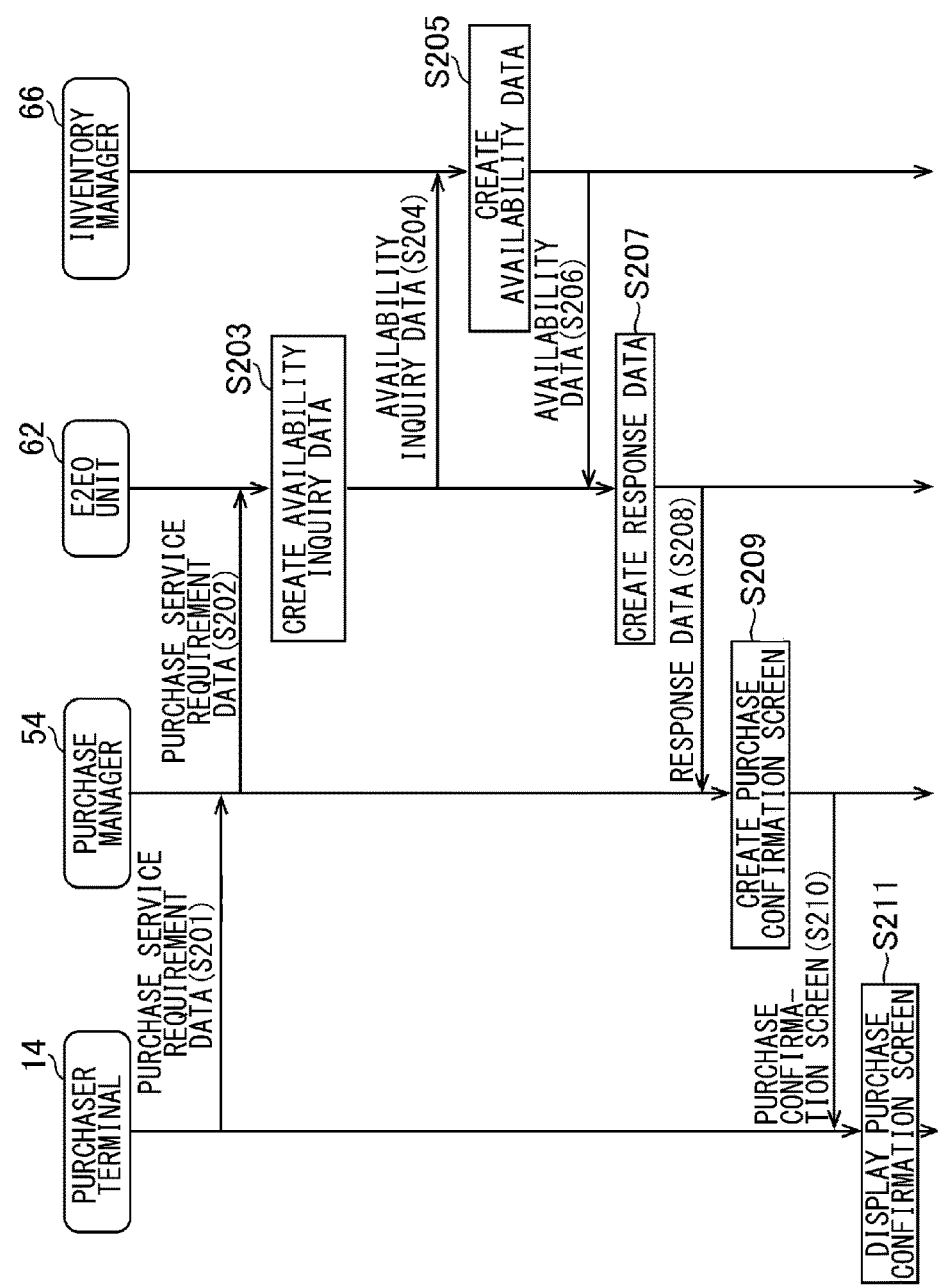
FIG. 23 is a flowchart illustrating an example of a processing flow performed by a purchaser terminal, the MPS, and the NOS according to the underlying technology.

Next, a description will be given of a processing flow performed by the purchaser terminal 14, the MPS 10, and the NOS 12 when the purchaser clicks on the Next button 32 on the service requirement input screen illustrated in FIG. 3 with reference to a flowchart illustrated in FIG. 23.

First, the purchaser terminal 14 transmits, to the purchase manager 54 of the MPS 10, purchase service requirement data associated with a purchase bundle ID (S201). The purchase bundle ID is a bundle ID of a network service selected by the purchaser on the purchase screen illustrated in FIG. 2. The purchase service requirement data is service requirement data showing input on the service requirement input screen illustrated in FIG. 3.

Then, the purchase manager 54 of the MPS 10 transmits, to the E2EO unit 62 of the NOS 12, purchase service requirement data that is received in the process shown in S201 and is associated with the purchase bundle ID (S202).

Then, the E2EO unit 62 of the NOS 12 creates availability inquiry data on the basis of service catalog data associated with the purchase bundle ID (S203). Here, for example, availability inquiry data showing a type of a functional unit group via which the network service to be purchased is implemented and the number of functional units for each type is created.

Then, the E2EO unit 62 outputs, to the inventory manager 66, the availability inquiry data created in the process shown in S203 (S204).

Then, the inventory manager 66 creates availability data on the basis of the availability inquiry data thus received, inventory data, and inventory template data (S205). Here, for example, availability data showing any of (1) a case where it is possible to allocate a hardware resource to which the functional unit group is deployed and that is shown in the received availability inquiry data, (2) a case where it is possible to allocate the hardware resource by adding an available server to the resource pool, or (3) a case where it is not possible to allocate the hardware resource is created.

Then, the inventory manager 66 transmits, to the E2EO unit 62, the availability data created in the process shown in S205 (S206).

Then, the E2EO unit 62 creates response data on the basis of the availability data received in the process shown in S206 (S207). Here, for example, when the availability data shows either of the above-described (1) and (2), response data showing a positive acknowledgment is created, and when the availability data shows the above-described (3), response data showing a negative acknowledgment is created.

Then, the E2EO unit 62 transmits, to the purchase manager 54 of the MPS 10, the response data created in the process shown in S207 (S208).

Then, the purchase manager 54 creates a purchase confirmation screen on the basis of the response data received in the process shown in S208 (S209). Here, for example, when the received response data shows a positive acknowledgment, the purchase confirmation screen illustrated in FIG. 4, showing that the service will be available immediately, is created. On the other hand, when the received response data shows a negative acknowledgment, the purchase confirmation screen illustrated in FIG. 5, showing that a predetermined delivery time is required (for example, a delivery time of two weeks is required), is created.

Then, the purchase manager 54 transmits, to the purchaser terminal 14, the purchase confirmation screen created in the process shown in S209 (S210).

Then, the purchaser terminal 14 displays the purchase confirmation screen received in the process shown in S210 on the display of the purchaser terminal 14 (S211), and then the process described in this process example is brought to an end.

Figure 24:
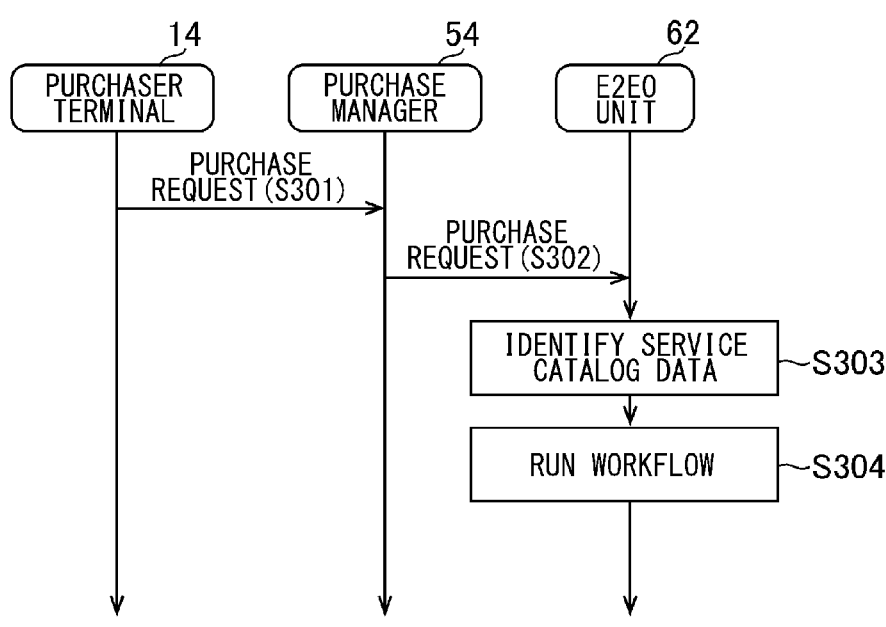
FIG. 24 is a flowchart illustrating an example of a processing flow performed by the purchaser terminal, the MPS, and the NOS according to the underlying technology.
Figure 25A:
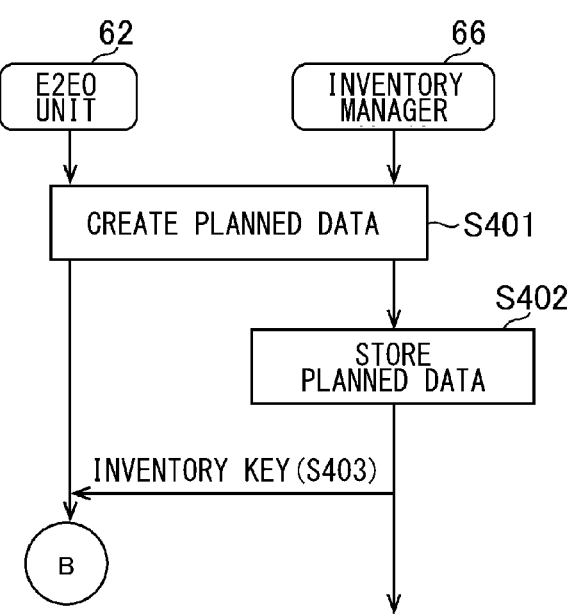
FIG. 25A is a flowchart illustrating an example of a processing flow performed by the NOS according to the underlying technology.
Figure 25B:
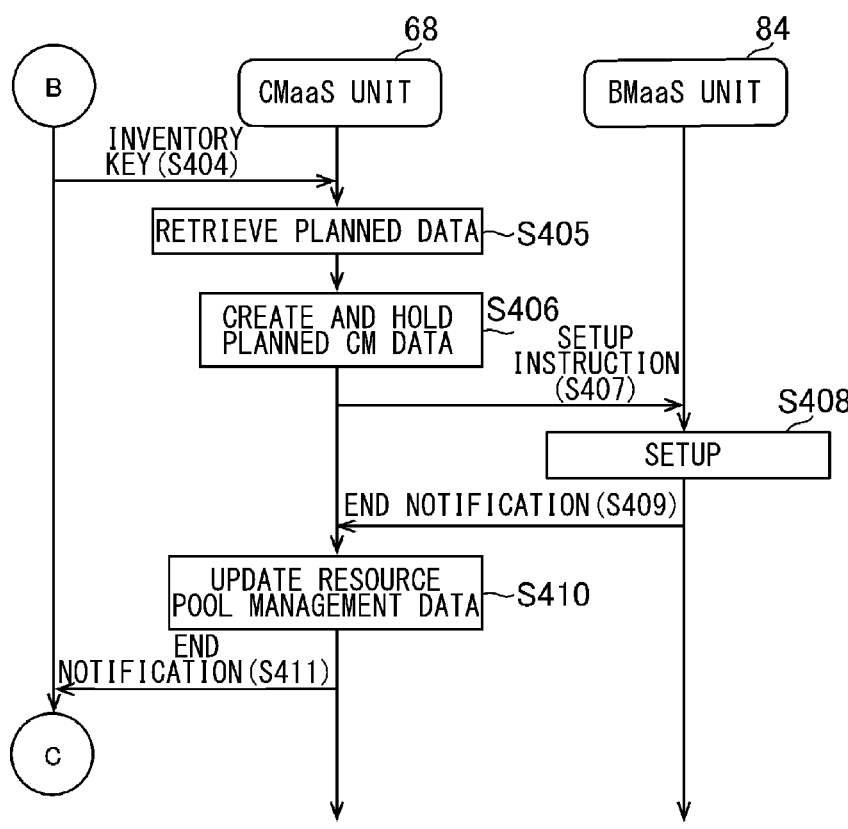
FIG. 25B is a flowchart illustrating an example of a processing flow performed by the NOS according to the underlying technology.
Figure 25C:
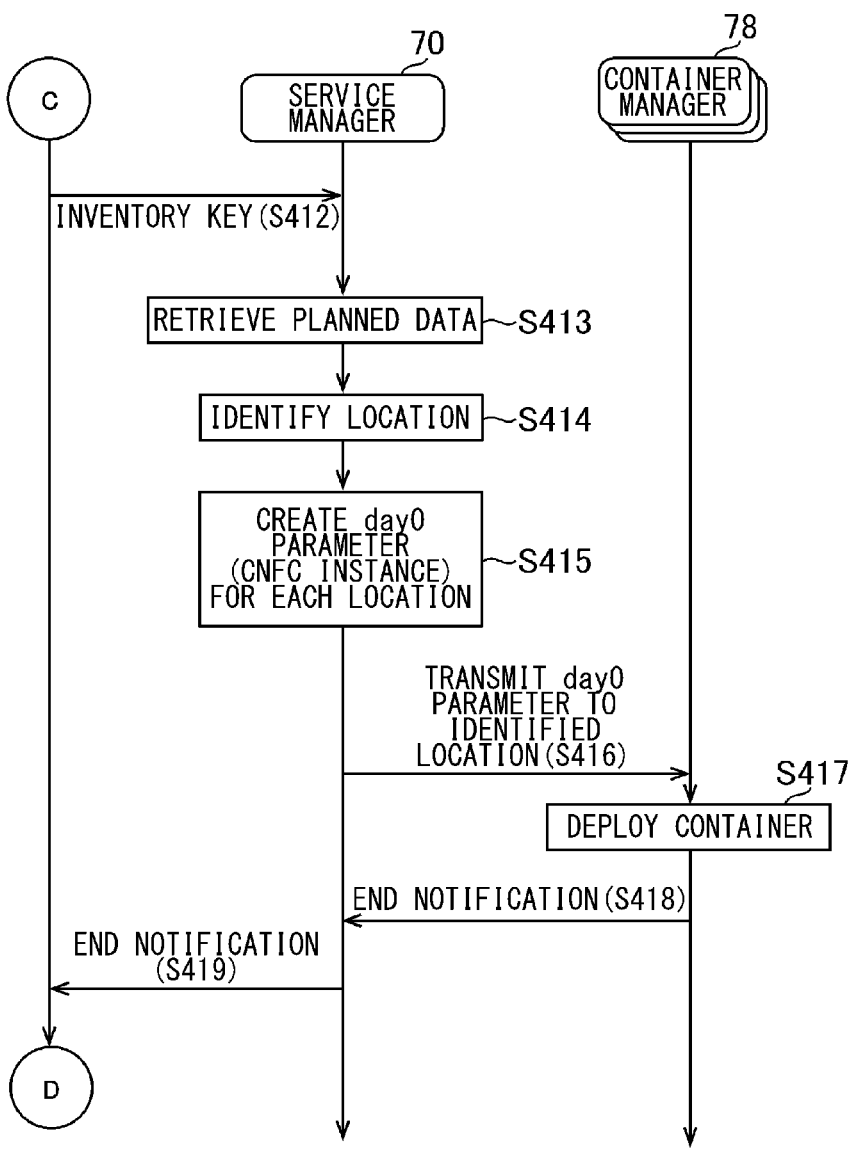
FIG. 25C is a flowchart illustrating an example of a processing flow performed by the NOS according to the underlying technology.
Figure 25D:
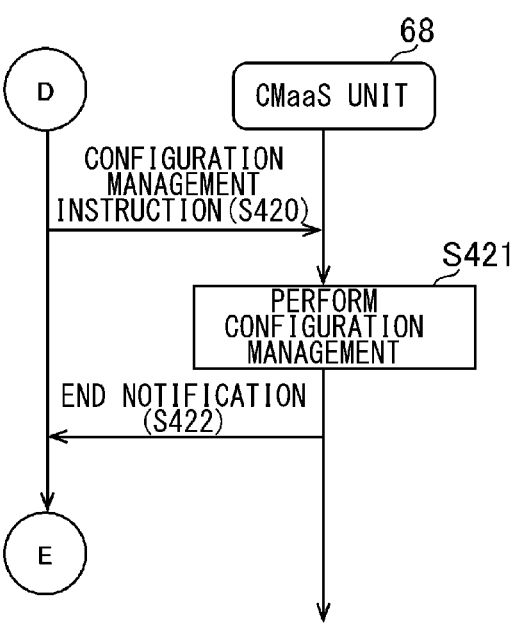
FIG. 25D is a flowchart illustrating an example of a processing flow performed by the NOS according to the underlying technology.
Figure 25E:
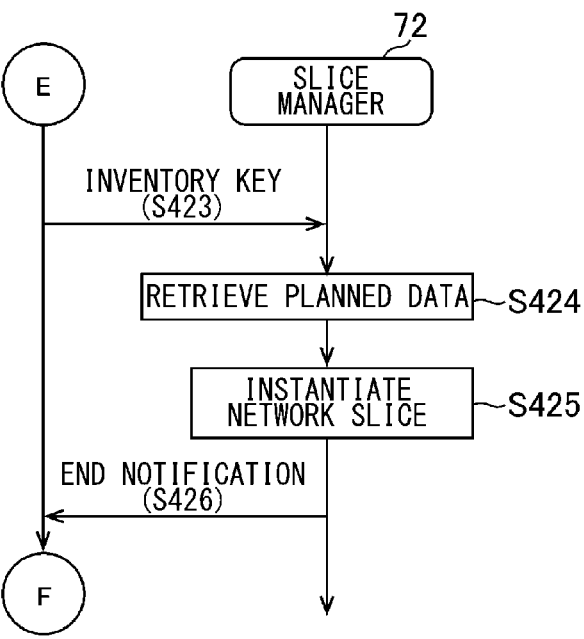
FIG. 25E is a flowchart illustrating an example of a processing flow performed by the NOS according to the underlying technology.
Figure 25F:
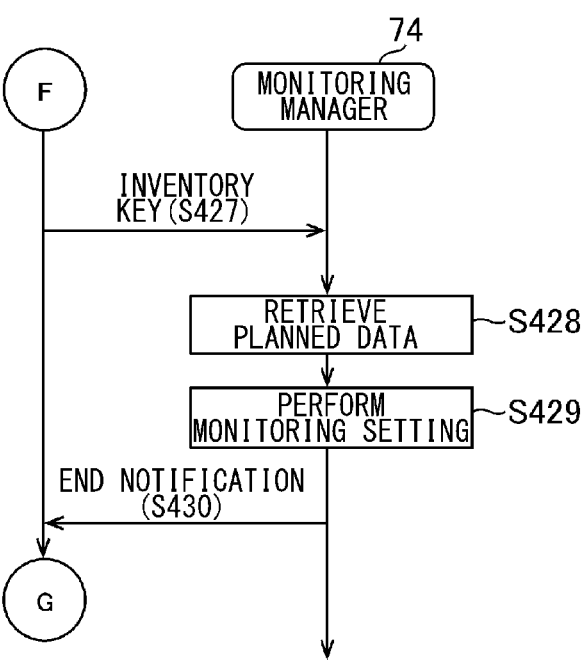
FIG. 25F is a flowchart illustrating an example of a processing flow performed by the NOS according to the underlying technology.
Figure 25G:
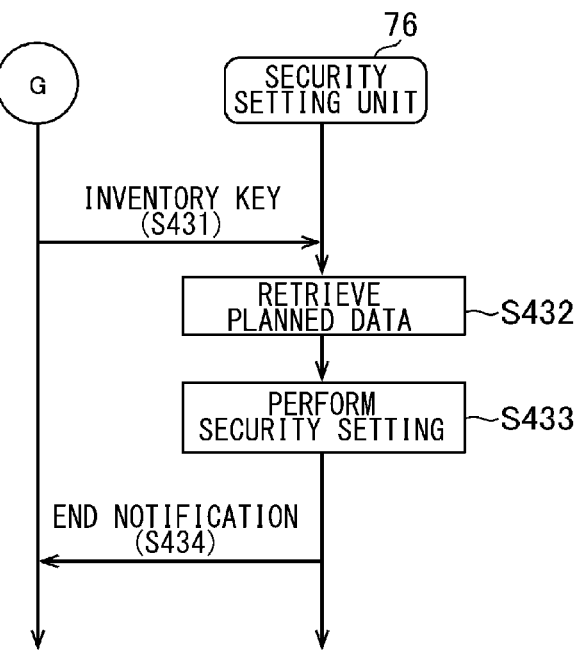
FIG. 25G is a flowchart illustrating an example of a processing flow performed by the NOS according to the underlying technology.

Next, a description will be given of a processing flow performed by the purchaser terminal 14, the MPS 10, and the NOS 12 when the purchaser clicks on the purchase button 34 on the purchase confirmation screen illustrated in FIG. 4 or 5 with reference to a flowchart illustrated in FIG. 24.

First, the purchaser terminal 14 transmits a network service purchase request to the purchase manager 54 of the MPS 10 (S301). It is assumed that the purchase request is associated with the purchase bundle ID and the purchase service requirement data transmitted in the process shown in S201.

Then, the purchase manager 54 transmits, to the E2EO unit 62, the purchase request associated with the purchase bundle ID and the purchase service requirement data received in the process shown in S301 (S302).

Then, the E2EO unit 62 specifies service catalog data corresponding to the purchase bundle ID associated with the purchase request thus received (S303).

Then, the E2EO unit 62 retrieves the service catalog data specified in the process shown in S303 from the service catalog storage 64 and executes the script of the workflow shown by the service catalog data (S304), and then the process described in this process example is brought to an end.

Next, a description will be given of details of the process shown in S304 with reference to the flowcharts illustrated in FIGS. 25A to 25G.

First, the E2EO unit 62 and the inventory manager 66 create planned data on the basis of the purchase service requirement data, the service catalog data, the inventory template data, and the inventory data associated with the purchase request (S401). The process performed in S401 includes, for example, a process of specifying a resource pool to which the functional unit group is deployed and a required resource.

Then, the inventory manager 66 stores the planned data thus created into the inventory database 82 (S402).

Then, the inventory manager 66 outputs an inventory key included in the created planned data to the E2EO unit 62 (S403).

Then, the E2EO unit 62 outputs the inventory key thus received to the CMaaS unit 68 (S404).

Then, the CMaaS unit 68 retrieves, from the inventory database 82, the planned data including the inventory key thus received (S405).

Then, the CMaaS unit 68 creates and holds planned CM data including a day1 parameter on the basis of the planned data retrieved in the process shown in S405 (S406).

Then, the CMaaS unit 68 outputs, to the BMaaS unit 84, a setup instruction such as the allocation of a required hardware resource (S407), and the BMaaS unit 84 performs setup such as the allocation of a hardware resource in accordance with the instruction (S408). At this time, the setup of system software corresponding to a specific type of functional unit and the addition of an available server to a resource pool are performed as necessary.

Note that, according to the present embodiment, the addition of an available server to a resource pool may be performed with a margin (buffer). For example, a plurality of servers 90 may be collectively added to a resource pool.

Then, when the BMaaS unit 84 outputs an end notification to the CMaaS unit 68 (S409), the CMaaS unit 68 updates resource pool management data (S410). Here, for example, a value of the remaining core number data of the resource pool from which the hardware resource is allocated may be decremented. Further, the number of available servers or the total core number data may be updated. Note that, in the process shown in S410, the BMaaS unit 84 rather than the CMaaS unit 68 may update the resource pool management data. Alternatively, the inventory manager 66 may update the resource pool management data in accordance with an instruction from the CMaaS unit 68.

Then, the CMaaS unit 68 outputs an end notification to the E2EO unit 62 (S411).

Then, the E2EO unit 62 outputs the inventory key received in the process shown in S403 to the service manager 70 (S412).

Then, the service manager 70 retrieves, from the inventory database 82, planned data including the inventory key thus received (S413).

Then, the service manager 70 specifies a location where the functional unit group is deployed on the basis of the planned data retrieved in the process shown in S418 (S414).

Then, the service manager 70 creates a day0 parameter (CNFC instance) for each location specified in the process shown in S414 (S415).

Then, the service manager 70 outputs, to the container manager 78 corresponding to each location specified in the process shown in S414, the day0 parameter corresponding to the container manager 78 (S416).

Then, the container manager 78 performs container deployment on the basis of the day0 parameter thus received (S417).

Then, the container manager 78 outputs an end notification to the service manager 70 (S418).

Then, the service manager 70 outputs an end notification to the E2EO unit 62 (S419).

Then, the E2EO unit 62 outputs a configuration management instruction based on the day1 parameter to the CMaaS unit 68 (S420).

Then, the CMaaS unit 68 performs container group configuration management on the basis of the day1 parameter included in the held planned CM data (S421).

Then, the CMaaS unit 68 outputs an end notification to the E2EO unit 62 (S422).

Then, the E2EO unit 62 outputs the inventory key received in the process shown in S403 to the slice manager 72 (S423).

Then, the slice manager 72 retrieves, from the inventory database 82, the planned data including the inventory key thus received (S424).

Then, the slice manager 72 performs the instantiation of a network slice on the basis of the planned data retrieved in the process shown in S429 (S425). In the process shown in S425, for example, as described above, the slice manager 72 may output a configuration management instruction related to the instantiation of a network slice to the CMaaS unit 68. Then, the CMaaS unit 68 may perform configuration management such as setting in accordance with the configuration management instruction.

Further, as described above, the processes shown in S420 to S422 need not be performed, and the CMaaS unit 68 may update the day1 parameter on the basis of the configuration management instruction received from the slice manager 72 in the process shown in S425. Then, the CMaaS unit 68 may perform configuration management such as setting in accordance with the configuration management instruction.

Then, the slice manager 72 outputs an end notification to the E2EO unit 62 (S426).

Then, the E2EO unit 62 outputs the inventory key received in the process shown in S403 to the monitoring manager 74 (S427).

Then, the monitoring manager 74 retrieves, from the inventory database 82, the planned data including the inventory key thus received (S428).

Then, the monitoring manager 74 performs, on the basis of the planned data retrieved in the process shown in S428, monitoring setting in accordance with a monitoring policy shown by the purchase service requirement data (S429).

Then, the monitoring manager 74 outputs an end notification to the E2EO unit 62 (S430).

Then, the E2EO unit 62 outputs the inventory key received in the process shown in S403 to the security setting unit 76 (S431).

Then, the security setting unit 76 retrieves, from the inventory database 82, the planned data including the inventory key thus received (S432).

Then, the security setting unit 76 performs security setting on the basis of the planned data retrieved in the process shown in S432 (S433).

Then, the security setting unit 76 outputs an end notification to the E2EO unit 62 (S434), and then the process described in this process example is brought to an end.

Actions taken at the time of network service provisioning triggered by the purchase of a service by the purchaser are summarized. Here, the purchased service is referred to as a "purchase target service". The E2EO unit 62 starts to execute a workflow corresponding to the purchase target service selected by the purchaser. The E2EO unit 62 and the inventory manager 66 create planned data for the purchase target service by filling an inventory template of the purchase target service with inventory data (an IP address, a host name, etc.), in other words, by setting the inventory data in variable items of the inventory template.

The service manager 70 creates day0 data (day0 parameter) by filling service template data of the purchase target service with the content shown by the planned data. The service manager 70 passes the day0 data thus created to the container manager 78 (Kubernetes). The container manager 78 creates a CNFC (in other words, an application) for the purchase target service on the basis of the day0 data.

The CMaaS unit 68 creates day1 data (day1 parameter) by filling CM template data of the purchase target service with the content shown by the planned data. The CMaaS unit 68 inputs the day1 data thus created to the CNFC for the purchase target service.

The slice manager 72 creates slice data by filling slice template data of the purchase target service with the content shown by the planned data. The slice manager 72 passes the slice data thus created to the CMaaS unit 68. The CMaaS unit 68 inputs the settings of the network slice and the network slice subnet to the CNFC (in other words, the application) on the based on the slice data.

The monitoring manager 74 performs, on the basis of information on a functional unit group (for example, CNFC) to be constructed and monitoring script data delivered at the time of onboarding of the bundle file, a monitoring process on the functional unit group. For example, the monitoring manager 74 may create monitoring setting data by filling the monitoring script data of the purchase target service with the content shown by the planned data serving as the information on the functional unit group to be constructed. The monitoring manager 74 may start the monitoring process based on the monitoring setting data. The monitoring setting data includes, for example, (1) a monitoring frequency, (2) a monitoring target and a hierarchical structure of the monitoring target, (3) logic for calculating a KPI from metric data acquired from the CNFC, and (4) a threshold serving as a trigger for transmitting alarm information.

A description will be given of another example of how monitoring manager 74 creates the monitoring setting data. The service manager 70 may notify the inventory manager 66 of information (for example, information such as an IP address and a host name) on the NS, CNF, and CNFC constructed in response to the purchase of the service by the purchaser, and the inventory manager 66 may store the information into the inventory database 82 with the information associated with the purchase target service. The monitoring manager 74 may retrieve information on the NS, CNF, and CNFC of the purchase target service from the inventory manager 66 (the inventory database 82) and set the information in the variable items of the monitoring script data of the purchase target service to create the monitoring setting data. Note that the monitoring manager 74 may directly retrieve, from the service manager 70, the information on the NS, CNF, and CNFC constructed by the service manager 70.

Further, the monitoring manager 74 may retrieve information on the NSI and NSSI of the purchase target service (for example, setting information on the NSI and NSSI) from the slice manager 72. The monitoring manager 74 may create the monitoring setting data by setting the information on the NSI and NSSI of the purchase target service in the variable items of the monitoring script data of the purchase target service. Note that the slice manager 72 may notify the inventory manager 66 of the information on the NSI and NSSI of the purchase target service. In this case, the monitoring manager 74 may retrieve the information on the NSI and NSSI of the purchase target service from the inventory manager 66.

According to the NOS 12, when the vendor providing a network service uploads, to the NOS 12, a bundle file including first data (for example, technology section data) defining a functional unit group via which the network service is implemented and second data (for example, operation section data) defining a monitoring policy for the network service, construction of the functional unit group via which the network service is implemented and monitoring setting of the network service are automatically performed in response to the purchase of the network service by the purchaser. The vendor can flexibly construct the network service by adjusting the content of the bundle file. This further allows the network service to be quickly provided to the purchaser in response to the purchase of the network service by the purchaser.

Embodiment Related to User Management Technology

A description will be given of a specific example of a user management technology based on the above-described underlying technology.

First Embodiment

A network system implemented by the underlying technology or the like is a so-called multitenant system that can operate separately for each area assigned to a corresponding one of a plurality of user entities such as companies and individuals while allowing the user entities to share physical resources such as a server and a storage area. Here, a tenant refers to a logical partition of resources such as a server and a database allocated to a user entity of a network service.

Taking the underlying technology as an example, the purchaser of a network service corresponds to a system administrator of a company or the like. For example, when the system administrator purchases a network service as a system of a company to which the system administrator belongs, a container is deployed to a server, and a required application such as attendance management or inventory management used by employees is brought into operation.

The following description will be given on the basis of such a use case, but is not intended to limit the purpose of creating a tenant, the number of users who use the tenant, and the like. For example, a service provided by the computer system is not limited to a service that provides communications, and may be various types of information processing such as a cloud service.

Figure 26:
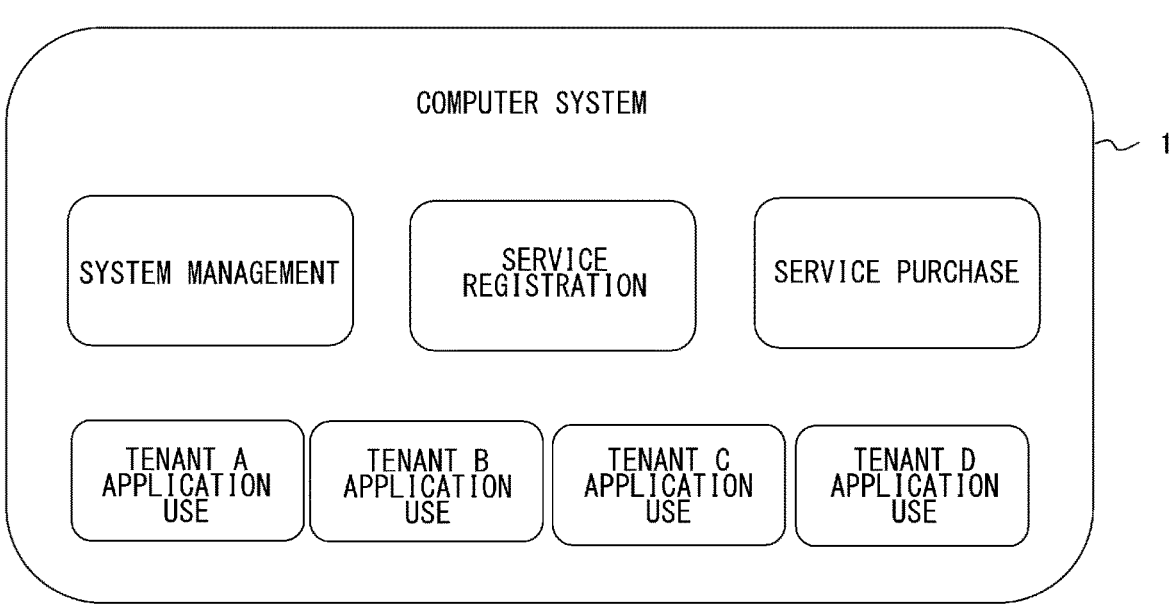
FIG. 26 is a diagram illustrating task categories in a computer system assumed for the present embodiment.

FIG. 26 illustrates task categories in the computer system 1. In this example, the task categories related to the computer system 1 include "system management" for managing the entire system, "service registration" for registering a service to be provided, "service purchase" for purchasing a network service, and "tenant A application use", "tenant B application use", "tenant C application use", and "tenant D application use" for using applications in tenants A, B, C, and D.

An entity responsible for the "system management" is a person belonging to a company that provides an infrastructure of the computer system 1 or takes charge of overall operation and management of the computer system 1. Hereinafter, such a person referred to as a "system owner". Under the underlying technology, an entity responsible for the "service registration" is a vendor that registers a bundle file. An entity responsible for the "service purchase" is a system administrator or the like belonging to an organization that uses a tenant and corresponds to a "purchaser" under the underlying technology. Hereinafter, such an administrator for each tenant is referred to as a "tenant administrator".

Entities responsible for the "tenant A application use" to "tenant D application use" are members of an organization corresponding to each tenant, such as employees of a company. Hereinafter, such a member is referred to as a "general user". In this way, personnel in various positions access the computer system 1 to request processing or update data for various purposes. Further, a tenant may be subject to changes such as addition, deletion, or integration. Furthermore, one user may perform a plurality of types of tasks. For example, the tenant administrator can purchase a network service and use an application in a created tenant.

As described above, in a large-scale system that allows flexibility in configuration, it is an important to safely perform user authentication and management of access permission. For example, in a system in the related art, users are under centralized management by one instance. In this case, setting up a repository including information on users and groups, and related security credentials, a so-called realm, makes entities for authenticating the users and authentication policies distinguishable from each other. Further, access permission may be set by assigning an authentication level defined in an application, a so-called role, to a user.

Even when such various types of technologies are introduced, an unexpected situation in which user information can be browsed from a terminal of another organization due to a bug, an error, or the like in a management program may occur. Therefore, according to the present embodiment, running user management instances in finer units corresponding to the task categories or the like makes the system higher in security, that is, less prone to unexpected events such as information leakage or unauthorized access.

Figure 27:
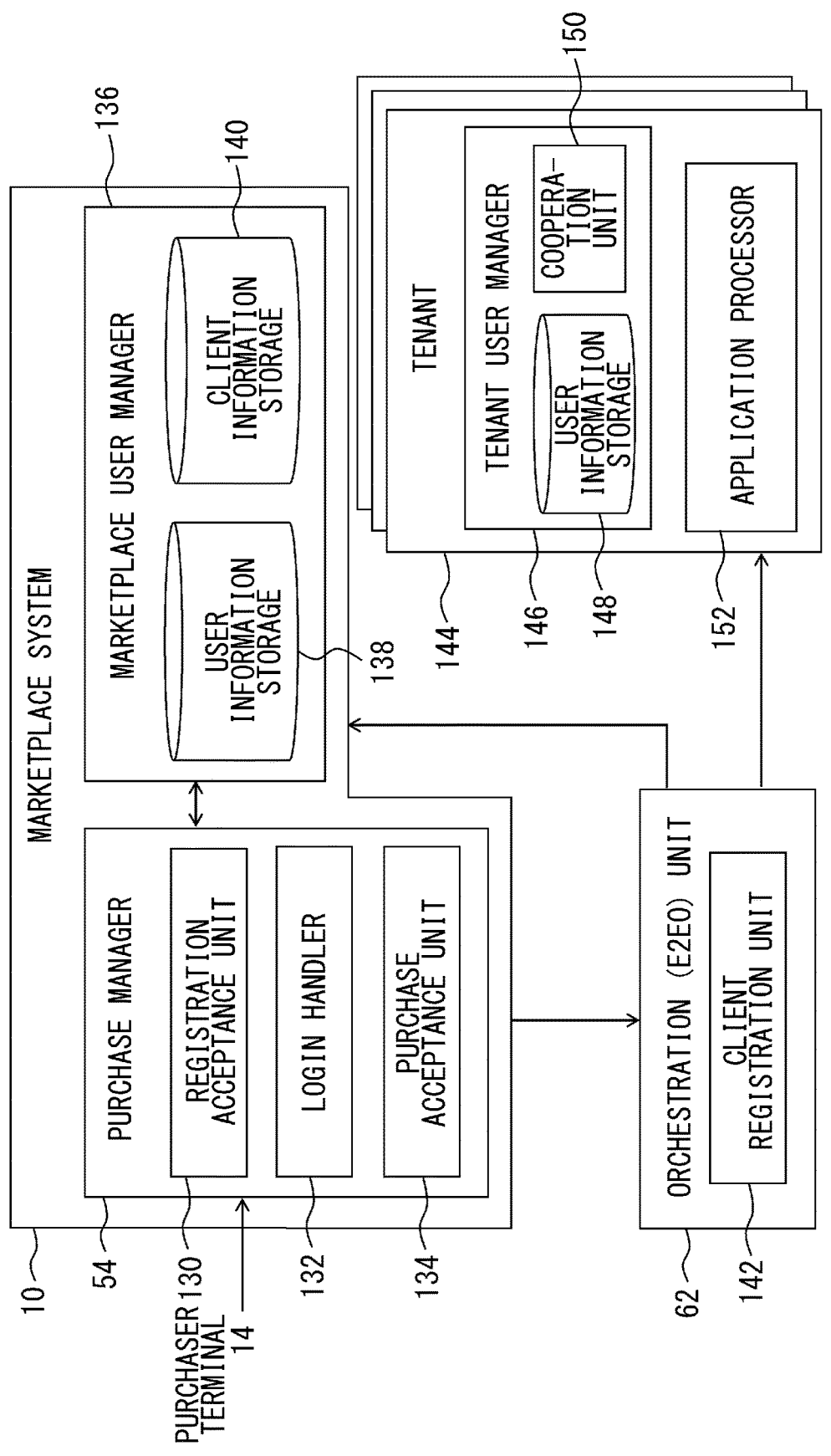
FIG. 27 is a diagram illustrating a configuration of functional blocks of a marketplace system (MPS), an E2EO unit, and a tenant according to a first embodiment.

FIG. 27 illustrates a configuration of functional blocks of a marketplace system (MPS), an E2EO unit, and a tenant according to a first embodiment. Note that FIG. 27 illustrates functional blocks related to user management, and the functions via which the network service is implemented are as described in the section of the underlying technology. The MPS 10 includes a marketplace user manager 136 in addition to the purchase manager 54 illustrated in FIG. 10.

The purchase manager 54 includes a registration acceptance unit 130 that accepts user registration of the tenant administrator, a login handler 132 that handles a login of the tenant administrator, and a purchase acceptance unit 134 that accepts purchase of a tenant. The registration acceptance unit 130 accepts user registration performed by the tenant administrator for the purpose of purchasing a tenant via the purchaser terminal 14 used by the tenant administrator. The login handler 132 receives a login request to the system from the tenant administrator already registered as a user.

The purchase acceptance unit 134 receives a tenant purchase request from the tenant administrator who has logged in to the MPS 10. The function of the purchase acceptance unit 134 is the same as the function of the purchase manager 54 described in the section of the underlying technology. That is, the purchase acceptance unit 134 causes the purchaser terminal 14 used by the tenant administrator to display the various types of screens illustrated in FIGS. 2 to 5 to acquire information on details of the service to be implemented in the tenant. Note that the screens presented to the tenant administrator by the purchase acceptance unit 134 are not limited to FIGS. 2 to 5.

The marketplace user manager 136 manages information on a user whose registration has been accepted by the registration acceptance unit 130, that is, the tenant administrator. More specifically, the marketplace user manager 136 has a function of managing user information and access to resources. Such a function is so-called identity and access management (IAM). The marketplace user manager 136 has the following functions, for example:

Authentication: Authenticate access to the system using a password, biological information, or the like;

Authorization: Authorize access to or processing in the system within the scope of privilege; Role setting: Set the scope of privilege in the system as a role;

Delegation: Allowing delegation of administrative privilege to a role with a higher privilege; and Interchange: Exchange information between different management domains.

The marketplace user manager 136 internally includes a user information storage 138 and a client information storage 140. The user information storage 138 stores user information necessary for implementing the above-described functions of the marketplace user manager 136, such as identification information, a password, and an attribute of a user. The registration acceptance unit 130 stores user information on the tenant administrator whose registration has been accepted into the user information storage 138. The registration acceptance unit 130 may appropriately correct or delete, upon receipt of a request to correct or delete the user information from the tenant administrator or the like, the information stored in the user information storage 138 in accordance with the request.

The client information storage 140 stores information on a client such as an application or a service running on a purchased tenant. For example, when a tenant is created, information on a client running on the tenant is stored into the client information storage 140. The client information includes, in addition to client identification information, association information for enabling authentication in the marketplace user manager 136 at the time of user access to the client, such as an access key, an uniform resource locator (URL) for callback, or the like.

In response to the purchase request received by the purchase acceptance unit 134, the E2EO unit 62 creates a tenant 144 by deploying a required function or service to a server as described in the section of the underlying technology. Here, the E2EO unit 62 includes a client registration unit 142 that registers information on a client in the tenant 144 thus created into the client information storage 140 of the marketplace user manager 136. Note that only the E2EO unit 62 is illustrated in FIG. 27, but in practice, the tenant is created under the cooperation of the functional blocks belonging to the NOS 12 illustrated in FIG. 10.

Although, herein, a service or an application implemented as a tenant is a "purchase" target, the "purchase" target according to the present embodiment is not limited to such a service or an application, and the tenant administrator may simply request creation of a tenant. The tenant creation procedure is not limited to the procedure described in the section of the underlying technology, and a technology adopted into a general network service or cloud service may be applied.

The tenant 144 is an entity responsible for implementing a service, the entity being created in response to a tenant creation request from the tenant administrator and used by a general user or the like. In the entire computer system, the tenants 144 exist as many as the number of tenants created by the E2EO unit 62. Such tenants can be collectively regarded as a "tenant operating system". On the other hand, a system that includes the MPS 10 and the E2EO unit and receives the tenant creation request to create a tenant can be regarded as a "tenant creation system".

Each tenant 144 includes a tenant user manager 146 and an application processor 152. The tenant user manager 146 has a function equivalent to the function of the above-described marketplace user manager 136. However, a management target is mainly a general user who accesses a client in a tenant to use a service. On the other hand, the marketplace user manager 136 can be regarded as an "intra-tenant creation system user manager".

The tenant user manager 146 includes a user information storage 148 and a cooperation unit 150. The user information storage 148 stores user information necessary for implementing the functions of the tenant user manager 146, such as identification information, a password, and an attribute of a general user. The information on the general user may be appropriately registered after the tenant is created.

The cooperation unit 150 cooperates with another authentication function to enable authentication and authorization with using user information other than the information stored in the user information storage 148. For example, as described above, the cooperation unit 150 delegates authentication and authorization to the marketplace user manager 136 in response to access to the client by at least some users, that is, the tenant administrator registered in the MPS 10. This allows the tenant administrator to access the client in the tenant using the registration information in the MPS 10.

On the other hand, the cooperation unit 150 may cooperate with an external user management mechanism (not illustrated). For example, when there is another system that manages employees in a company, the cooperation unit 150 cooperates with an identity provider (IDP) in the system. This allows the general user to access a client in a newly created tenant using the user information registered in the system. Such a configuration enables authentication and management of access to the client with the user information prevented from being unnecessarily spread. The application processor 152 is an entity of the client and performs a service specified by the tenant administrator or designed by the vendor.

Figure 28:
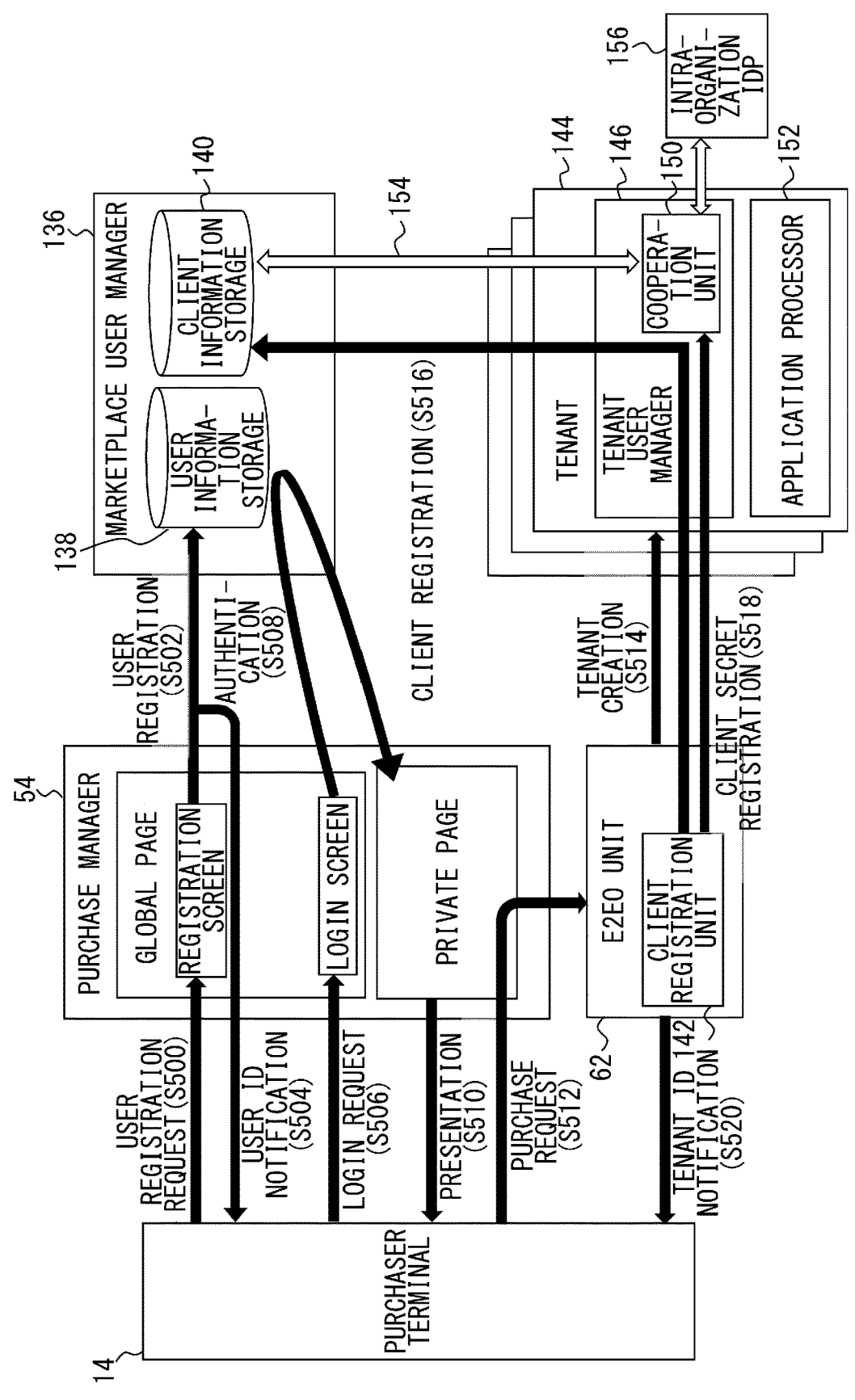
FIG. 28 is a diagram illustrating a procedure of constructing a management system according to the first embodiment.

Next, a description will be given of the operation of the computer system 1 implemented by the above-described configuration. FIG. 28 illustrating a procedure of constructing a management system according to the first embodiment. First, the tenant administrator makes a user registration request to the MPS 10 via the purchaser terminal 14 (S500). Specifically, the tenant administrator accesses a global page provided by the purchase manager 54 of the MPS 10 to cause the purchaser terminal 14 to display a registration screen.

When the tenant administrator inputs prescribed user information such as a user name, a password, and an organization name, the registration acceptance unit 130 of the purchase manager 54 receives the user information and transfers the user information to the marketplace user manager 136 to store the user information into the user information storage 138 (S502). In practice, the above-described process may be performed by the registration acceptance unit 130 that causes a browser to perform a redirect to the marketplace user manager 136. At this time, the marketplace user manager 136 issues a user ID for uniquely identifying the tenant administrator and returns the user ID to the purchaser terminal 14 via the registration acceptance unit 130 to notify the user of the user ID (S504). The user registration of the tenant administrator is done through the above-described process.

When purchasing a tenant, the tenant administrator who has performed the user registration makes a login request to the MPS 10 (S506). Specifically, the tenant administrator accesses the global page provided by the purchase manager 54 of the MPS 10 and causes the purchaser terminal 14 to display a login screen. When the tenant administrator inputs information used for authentication such as a user name or a user ID, and a password, the login handler 132 of the purchase manager 54 receives the information and transfers the information to the marketplace user manager 136 to perform authentication (S508).

In practice, this process may be performed by the login handler 132 that causes the browser to perform a redirect to the marketplace user manager 136. When the authentication results in a success such as a case where the input information coincides with the registration information, the marketplace user manager 136 enables a callback to an URL of a private page for the tenant administrator to present the private page to the user via the purchaser terminal 14 (S510).

At this time, the marketplace user manager 136 adds a user token for tenant purchase to the callback URL so as to cause the purchaser terminal 14 to acquire the user token. Note that the "private page" is a page that is generated for each organization to which the tenant administrator belongs and can be browsed only by members of the organization. On the other hand, the "global page" is a page that can be browsed by a user that is making registration into the MPS 10 or a registered user regardless of which organization the user belongs. Subsequently, the tenant administrator makes the tenant purchase request via the private page (S512).

Upon receipt of the request, the purchase manager 54 of the MPS 10 requests the E2EO unit 62 to create a tenant. In practice, this process may be performed by the procedure illustrated in FIGS. 23 and 24. In response to the purchase request, the purchase acceptance unit 134 of the purchase manager 54 acquires the user token issued to the tenant administrator together with necessary information such as a tenant name and a service requirement input by the tenant administrator to the private page for tenant purchase. Subsequently, the user token is used for associating the tenant administrator or organization that has made the tenant creation request with the tenant.

When the purchase acceptance unit 134 transfers the acquired information and user token to the E2EO unit 62, the E2EO unit 62 receives the information and the user token, and controls the process of creating the tenant 144 (S514). In practice, this process may be performed by the procedure illustrated in FIGS. 25A to 25G. For creating the tenant 144, the E2EO unit 62 issues a tenant ID for uniquely identifying the tenant.

Here, the E2EO unit 62 creates the tenant user manager 146 as a part of the tenant 144. The tenant user manager 146 is created so as to be logically or further physically isolated from the marketplace user manager 136 and tenant user managers 146 of other tenants. For example, the tenant user managers 146 are implemented by different containers. This makes the possibility of browsing or falsification of user information of another organization lower.

Subsequently, the E2EO unit 62 registers a client such as an application or a service to be run on the tenant 144 into the client information storage 140 of the marketplace user manager 136 (S516). Specifically, the client registration unit 142 of the E2EO unit 62 first causes the cooperation unit 150 of the tenant 144 to issue a callback URL to a page of the client. In practice, the cooperation unit 150 may be implemented as an IDP.

Then, the client registration unit 142 stores the callback URL into the client information storage 140 with the callback URL associated with the identification information on the client. In response to the storage, the marketplace user manager 136 issues a client secret as an access key from the client to the marketplace user manager 136. The client registration unit 142 receives the client secret and registers the client secret into the cooperation unit 150 of the tenant user manager 146 (S518).

On the other hand, the E2EO unit 62 returns the ID of the created tenant to the purchaser terminal 14 to notify the tenant administrator of the ID (S520). Through the above-described process, a process transition path from the client in the tenant to the marketplace user manager 136 and a process return path from the marketplace user manager 136 to the client are formed.

As a result, as indicated by an arrow 154, a cooperation system (federation) is established between the marketplace user manager 136 and the tenant user manager 146, and the user information registered first by the tenant administrator can also be used for authentication at the time of service use on the tenant 144 side. Note that, as described above, the tenant user manager 146 may cooperate with an external system (for example, an "intra-organization IDP 156") in a similar manner.

Figure 29:
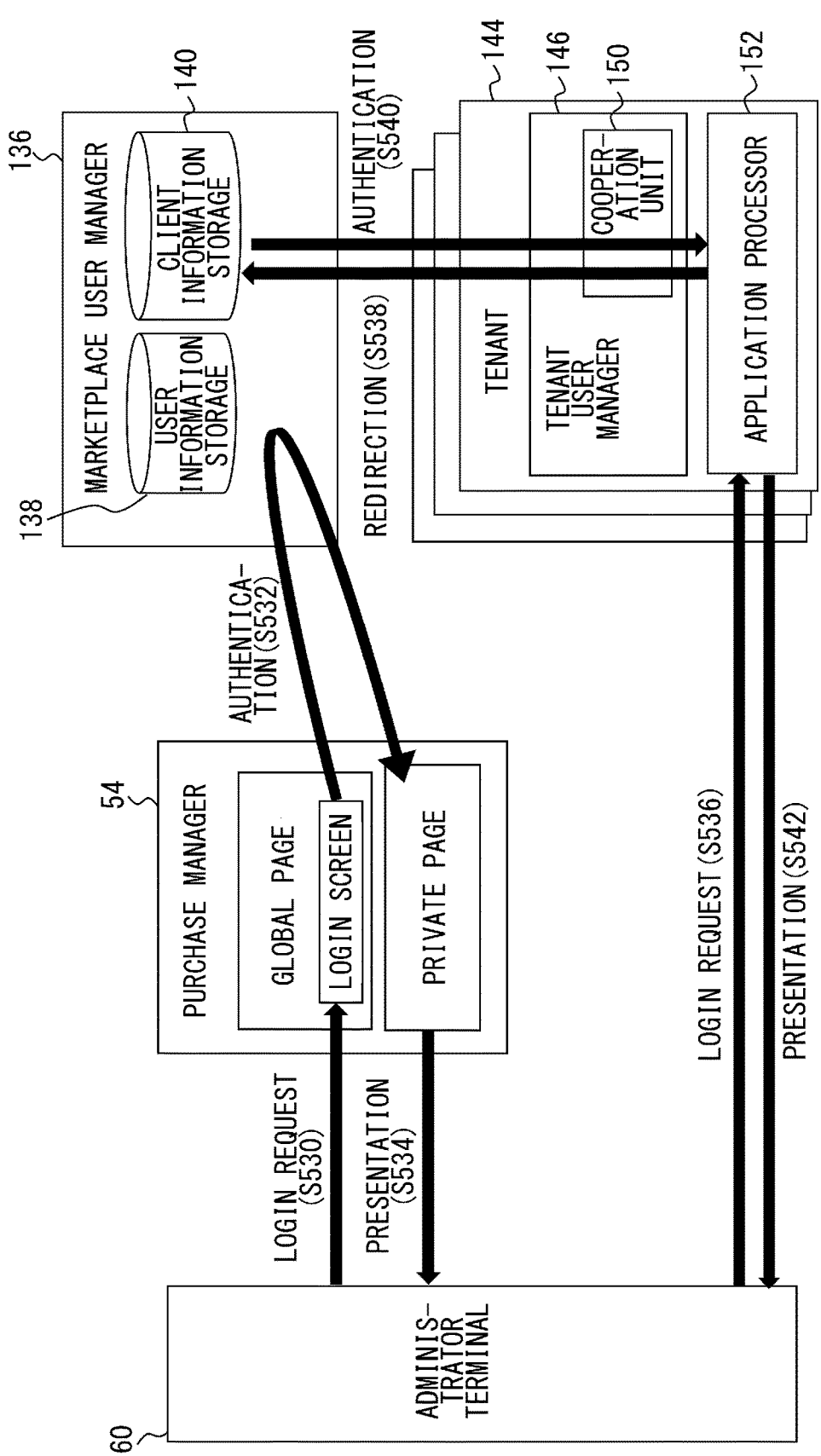
FIG. 29 is a diagram illustrating a procedure of a login process for a tenant administrator according to the first embodiment.

FIG. 29 illustrates a procedure of a login process for a tenant administrator according to the first embodiment. The terminal used by the tenant administrator is not limited to the purchaser terminal 14, and thus is an administrator terminal 160 in FIG. 29. Note that the administrator terminal 160 may be the same as the purchaser terminal 14. When the tenant administrator makes a login request to the MPS 10, a corresponding login process is the same in procedure as the login process for tenant purchase illustrated in FIG. 28.

That is, the tenant administrator accesses the global page provided by the purchase manager 54 of the MPS causes the administrator terminal 160 to display the login screen, and inputs a user ID, a password, and the like to make the login request (S530). Then, the login handler 132 of the purchase manager 54 receives the login request and transfers the login request to the marketplace user manager 136 so as to perform authentication (S532). When the authentication results in a success, the marketplace user manager 136 enables a callback to the private page, so that the private page is presented to the user via the administrator terminal 160 (S534).

On the other hand, when the tenant administrator uses an application or a service in the tenant, the procedure is as follows. First, the tenant administrator accesses a page provided by the application processor 152 of the tenant 144 corresponding to the organization to which the tenant administrator belongs. Then, the tenant administrator causes the administrator terminal 160 to display the login screen and inputs information necessary for login such as a user ID and a password to make the login request (S536). The tenant user manager 146 of the tenant 144 recognizes that the request source is the tenant administrator on the basis of the information thus input and causes the cooperation unit 150 to redirect the login request to the marketplace user manager 136 (S538).

At this time, the cooperation unit 150 guarantees the safety of access by transmitting the client secret. The marketplace user manager 136 verifies that the access is an authorized access on the basis of the client information stored in the client information storage 140, and then performs an authentication process on the basis of the user information storage 138. When the authentication results in a success, the marketplace user manager 136 performs a callback using the URL associated with the client (S540). This causes an after-login screen provided by the application processor 152 to be presented to the administrator terminal 160 (S542).

Figure 30:
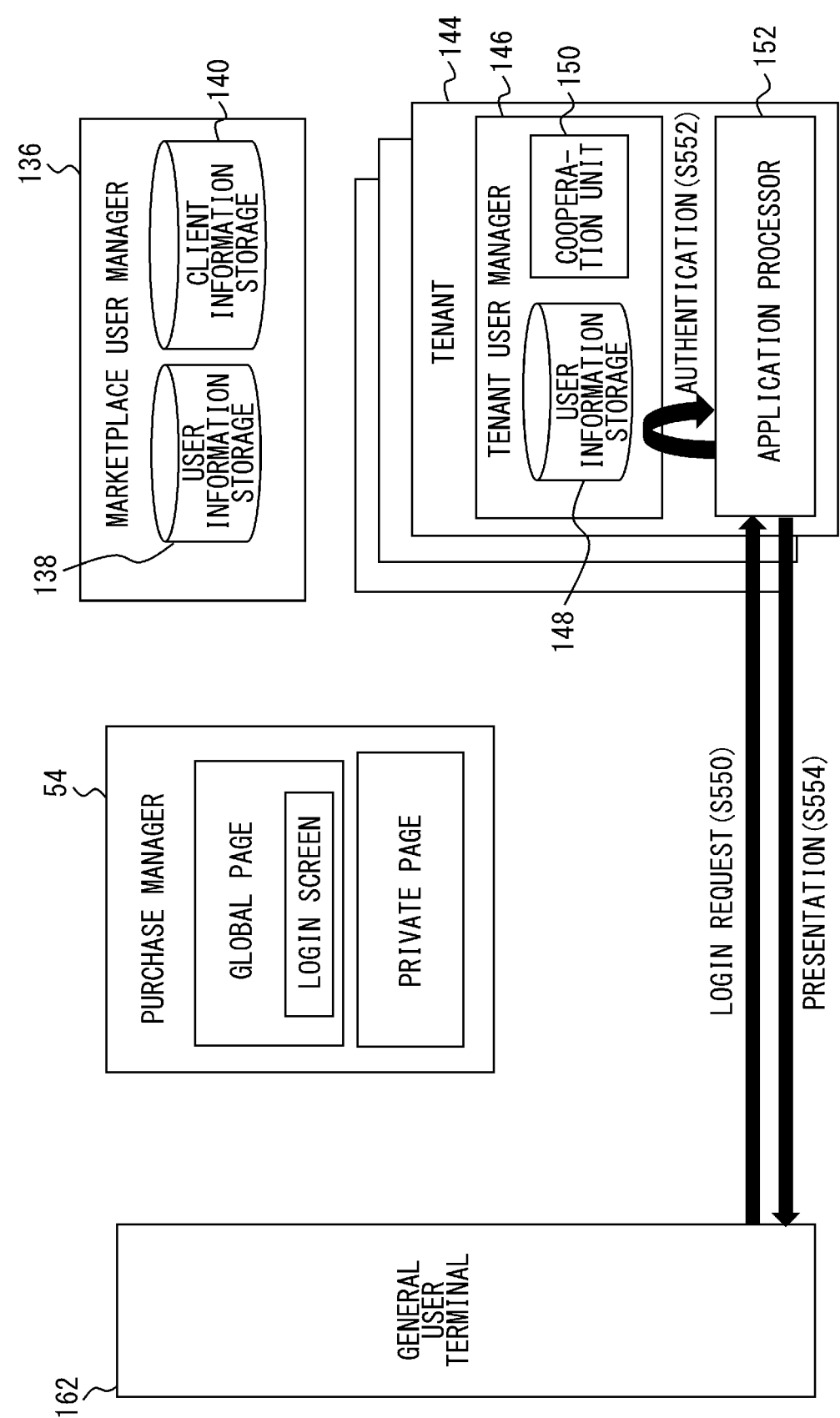
FIG. 30 is a diagram illustrating a procedure of a login process for a general user according to the first embodiment.

FIG. 30 illustrates a procedure of a login process for a general user according to the first embodiment. First, the general user uses a general user terminal 162 to access a page provided by the application processor 152 of the tenant 144 corresponding to the organization to which the general user belongs. Then, the general user causes the general user terminal 162 to display the login screen and inputs information necessary for login such as a user ID and a password to make the login request (S550).

The tenant user manager 146 of the tenant 144 recognizes that the request source is the general user on the basis of user information thus input and performs the authentication process on the basis of the user information storage 148 owned by the tenant user manager 146 (S552). When the authentication results in a success, the tenant user manager 146 performs a callback to a page provided by the application processor 152 to present an after-login screen provided by the application processor 152 to the general user terminal 162 (S554).

Figure 31:
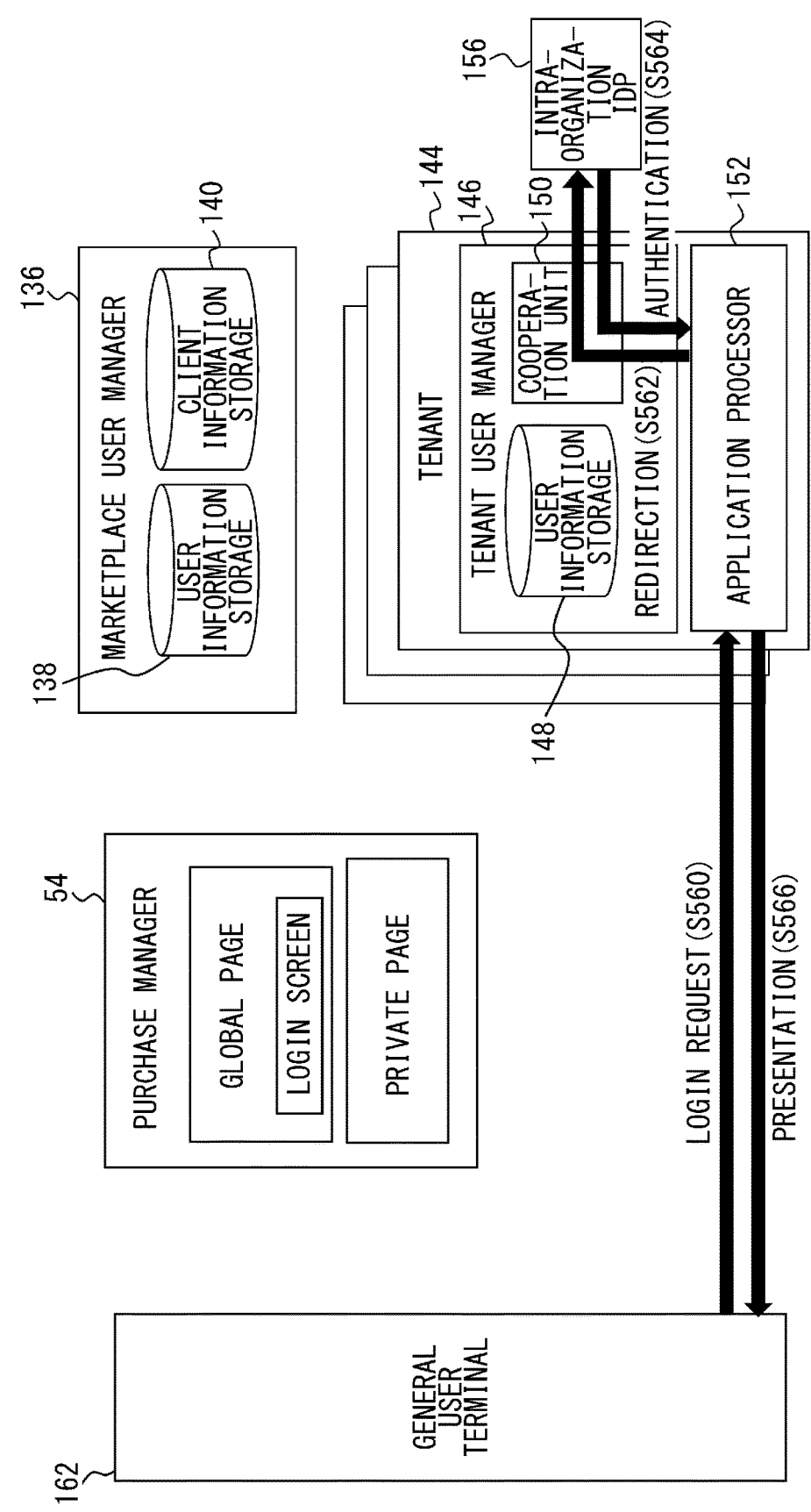
FIG. 31 is a diagram illustrating another procedure of a login process for a general user according to the first embodiment.

FIG. 31 illustrates another procedure of a login process for a general user according to the first embodiment. This example illustrates a case where cooperation with the intra-organization IDP 156 is used as an external management system of the computer system 1. Similar to the case of FIG. 30, the general user accesses a page provided by the application processor 152 of the tenant 144 corresponding to the organization to which the general user belongs. Then, the general user causes the general user terminal 162 to display the login screen and inputs information necessary for login such as a user ID and a password to make the login request (S560).

The tenant user manager 146 of the tenant 144 recognizes that the registration information on the request source is present in the intra-organization IDP 156 on the basis of the user information thus input and causes the cooperation unit

150 to redirect the login request to the intra-organization IDP 156 (S562). In this case as well, the safety of access may be guaranteed by using a client secret or the like. When the authentication results in a success, the intra-organization IDP 156 performs a callback to a page provided by the application processor 152 (S564). This causes an after-login screen provided by the application processor 152 to be presented to the general user terminal 162 (S566).

According to the first embodiment described above, the marketplace user manager 136 and the tenant user manager 146 for each tenant are individually constructed. This allows information on general users belonging to each organization to be isolated from the MPS 10. It is therefore possible to avoid, as much as possible, a problem such as a state where user information on other organizations can be browsed due to a failure or the like.

Further, creating the tenant user manager 146 for each tenant makes customization in accordance with an organization easier. For example, the login screen having a predetermined configuration can be modified so as to suit the convenience of an organization. In other words, the login screen and the data structure having a predetermined configuration are provided simultaneously with tenant creation, it is possible to construct a desired login environment with a simple modification within an organization. Further, handling of user information within an organization, that is, addition, correction, deletion, integration, or the like can be easily performed.

Furthermore, cooperation with an organization's unique IDP can be easily and safely performed. For example, it is not necessary to greatly change an originally existing mechanism of authentication, procedure, management, and the like, so that it is possible to lower an introduction barrier of a new service. Further, cooperation to enable the registration information in the MPS 10 to be used for login authentication in the tenant makes it possible to save trouble such as that the same registration needs to be performed twice in order for the tenant administrator to use a service.

Second Embodiment

Figure 32:
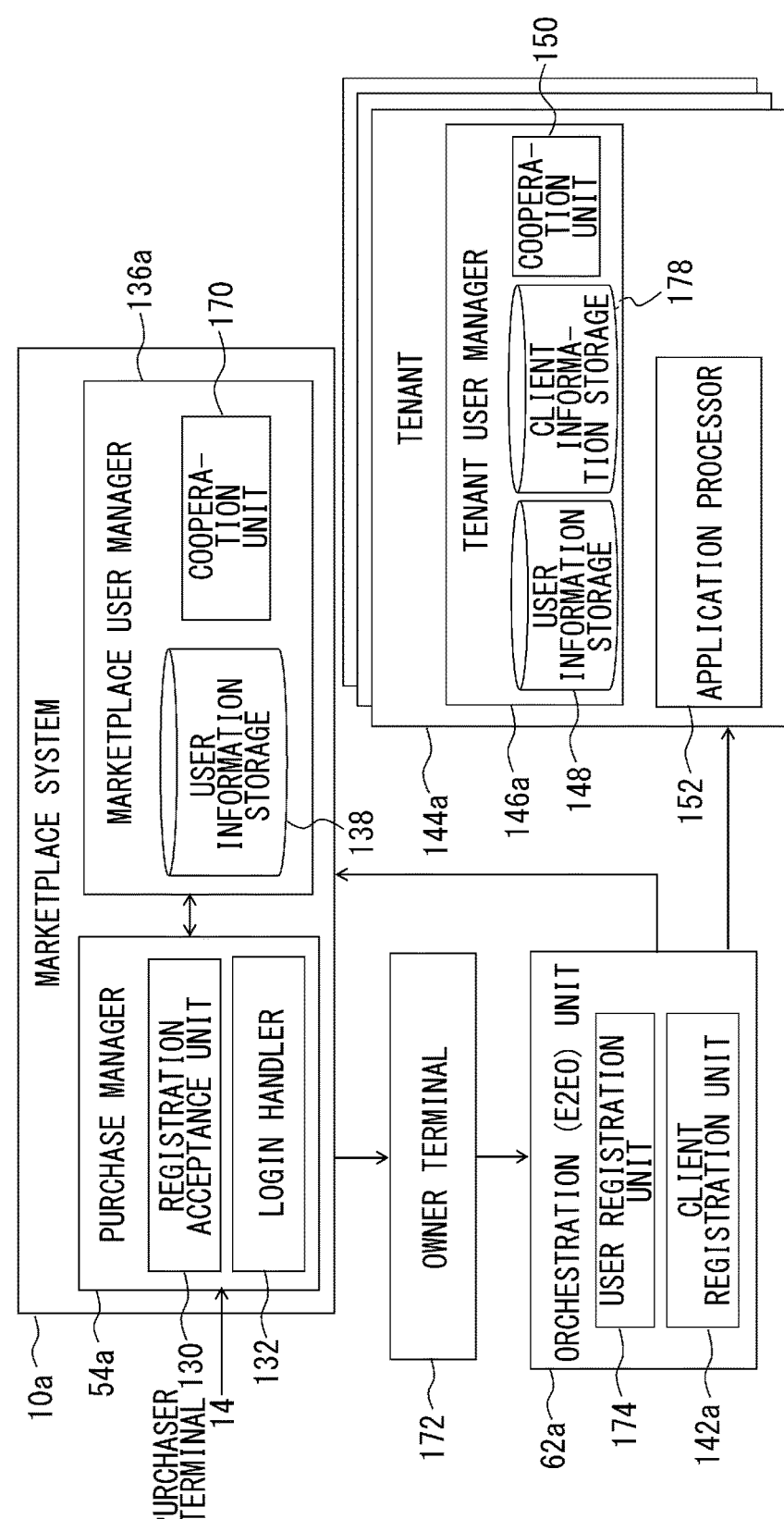
FIG. 32 is a diagram illustrating a configuration of functional blocks of a marketplace system (MPS), an E2EO unit, an owner terminal, and a tenant according to a second embodiment.

Hereinafter, differences from the first embodiment will be mainly described. FIG. 32 illustrates a configuration of functional blocks of a marketplace system (MPS), an E2EO unit, an owner terminal, and a tenant according to a second embodiment. In FIG. 32, blocks corresponding to the functional blocks illustrated in FIG. 27 are denoted by the same reference numerals as of the functional blocks illustrated in FIG. 27, and no description will be given of such blocks. According to the present embodiment, the configuration includes an owner terminal 172 in addition to an MPS 10a, an E2EO unit 62a, and a tenant 144a. The owner terminal 172 is a terminal used by the above-described system owner.

A purchase manager 54a of the MPS 10a according to the second embodiment includes a registration acceptance unit 130 that accepts user registration of a tenant administrator and a login handler 132 that handles a login of the tenant administrator. The functions of the registration acceptance unit 130 and the login handler 132 are the same as described with reference to FIG. 27. Further, the function of the marketplace user manager 136a is basically equivalent to the function of the marketplace user manager 136 illustrated in FIG. 27, but internally includes a user information storage 138 and a cooperation unit 170.

The function of the user information storage 138 is the same as described with reference to FIG. 27. The cooperation unit 170 cooperates with a tenant user manager 146a of the tenant 144a to perform authentication of a login to the MPS 10a using the tenant user manager 146a. The owner terminal 172 notifies the system owner that the tenant administrator has performed user registration into the MPS and receives permission to create a corresponding tenant from the system owner. Then, the owner terminal 172 requests the E2EO unit 62a to create the tenant for which permission has been received.

That is, according to the second embodiment, the tenant is created when the system owner uses the owner terminal 172 to verify the registration information on the tenant administrator and inputs a response indicating the permission. In response to the request from the owner terminal 172, the E2EO unit 62a deploys a required function or service to a server to create the tenant 144 as described in the section of the underlying technology. In practice, the tenant is created in cooperation with a functional block (not illustrated) other than the E2EO unit 62a.

Here, the E2EO unit 62a includes a user registration unit 174 and a client registration unit 142a. The user registration unit 174 registers the information on the tenant administrator who is a creation source of the tenant, into both the marketplace user manager 136a and the tenant user manager 146a belonging to the tenant 144a thus created. That is, according to the second embodiment, the creation of the tenant also causes the tenant administrator to be registered into the tenant user manager 146a side. The client registration unit 142a registers client information into the tenant user manager 146a belonging to the created tenant 144a.

The function of the tenant user manager 146a of the tenant 144a is basically equivalent to the function of the tenant user manager 146 illustrated in FIG. 27, but internally includes a user information storage 148, a client information storage 178, and a cooperation unit 150. The function of the user information storage 148 is the same as illustrated in FIG. 27, but according to the second embodiment, the E2EO unit 62 stores the user information on the tenant administrator in addition to the user information on the general user into the user information storage 148. The client information storage 178 stores information on a client such as an application or a service running on the tenant 144a. The client information includes an access key and realm settings.

The cooperation unit 150 cooperates with another authentication function to enable authentication and authorization with user information other than the information stored in the user information storage 148. According to the second embodiment, however, holding the information on the tenant administrator in the tenant user manager 146a eliminates the need of delegating authentication or authorization to the marketplace user manager 136a. Therefore, the cooperation unit 150 cooperates with other authentication mechanisms such as an intra-organization IDP.

The above-described configuration allows entities responsible for authentication and authorization to be collectively placed in the tenant. In this case, when the tenant administrator logs in to the MPS 10, the login state is also applied to the client in the tenant. This eliminates the need for the tenant administrator to log in to the tenant 144a again when using the service provided by the tenant 144a making the login process being simple.

Figure 33:
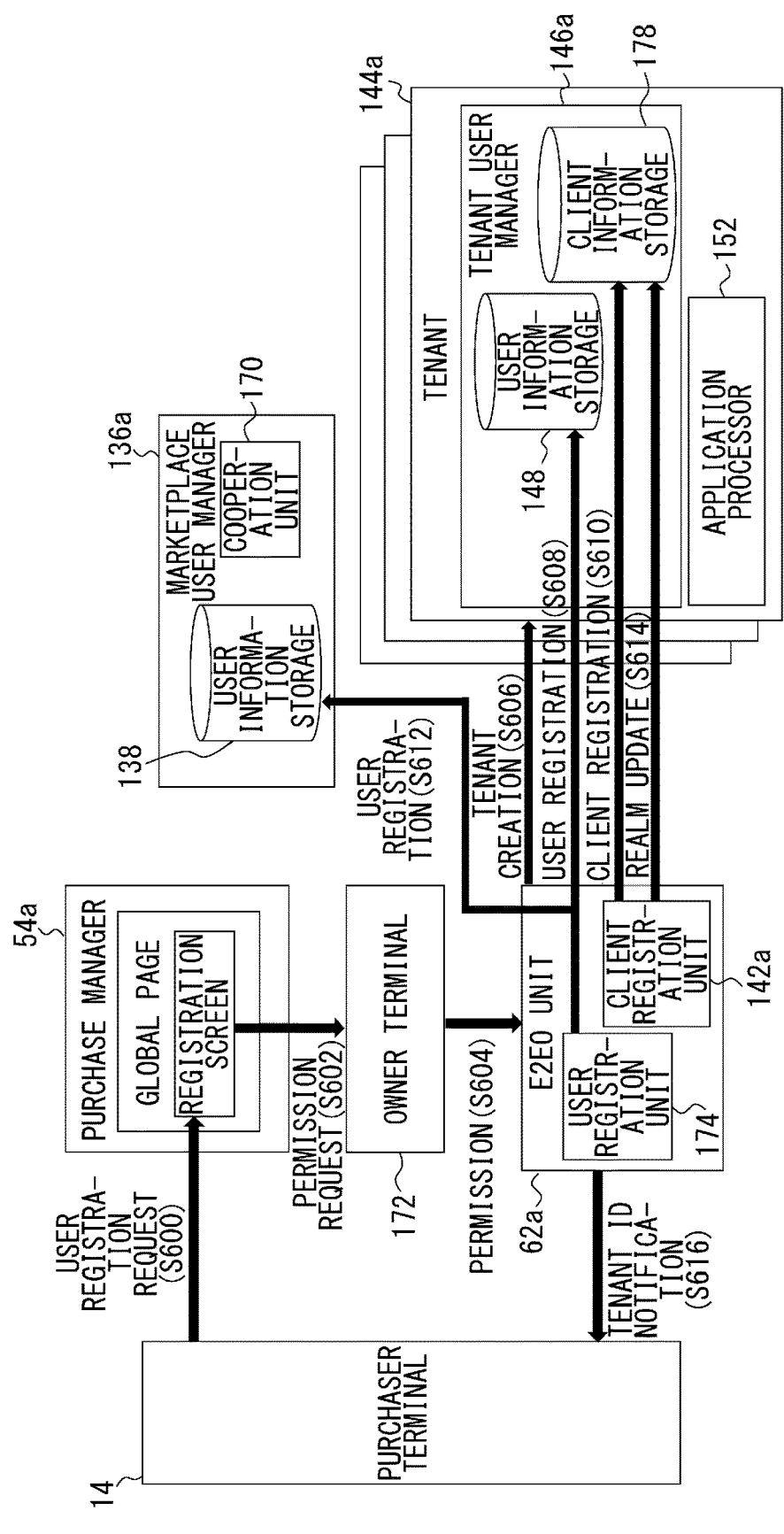
FIG. 33 is a diagram illustrating a procedure of constructing a management system according to the second embodiment.

Next, a description will be given of the operation of the computer system 1 implemented by the above-described configuration. FIG. 33 illustrating a procedure of constructing a management system according to the second embodiment. First, the tenant administrator makes a user registration request to the MPS 10a via the purchaser terminal 14 (S600). Specifically, the tenant administrator accesses a global page provided by the purchase manager 54a of the MPS 10a to cause the purchaser terminal 14 to display a registration screen.

When the tenant administrator inputs information necessary for creating a tenant such as a tenant name and a service requirement together with prescribed user information such as a user name, a password, and an organization name, the registration acceptance unit 130 of the purchase manager 54a receives the information and transmits the information to the owner terminal 172 to request the system owner to grant permission to create a tenant (S602). The system owner causes the owner terminal 172 to display the information thus received and performs predetermined verification to input a response indicating the permission. Upon receipt of the response, the owner terminal 172 requests the E2EO unit 62a to create the tenant (S604).

Upon receipt of the request, the E2EO unit 62a controls the process of creating the tenant 144a (S606). In practice, this process may be performed by the procedure illustrated in FIGS. 25A to 25G. For creating the tenant 144a, the E2EO unit 62 issues a tenant ID for uniquely identifying the tenant. The E2EO unit 62a further creates a tenant user manager 146a as a part of the tenant 144a. The tenant user manager 146a is created in the same manner as in the first embodiment so as to be logically or further physically isolated from the marketplace user manager 136a and tenant user managers 146a of other tenants.

Subsequently, the user registration unit 174 of the E2EO unit 62 performs user registration of the tenant administrator who is a tenant creation request source, into the tenant user manager 146a of the tenant 144a thus created (S608). This causes the user information on the tenant administrator to be stored into the user information storage 148. Further, the client registration unit 62 of the E2EO unit 142a registers a client such as an application or a service to be run on the tenant 144 into the tenant user manager 146a of the created tenant 144a (S610). This causes the client information to be stored into the client information storage 178.

Next, the user registration unit 174 of the E2EO unit 62 registers the user information on the tenant administrator, who is a tenant creation request source, and the ID of the created tenant, into the user information storage 138 of the marketplace user manager 136a with the user information and the ID associated with each other (S612). At this time, the user registration unit 174 assigns a role to the tenant administrator and stores the role together with the user information. This avoids, when the tenant administrator attempts to log in to the MPS 10a, the occurrence of an error due to absence of role settings.

The user registration unit 174 further stores a callback URL to a private page for the tenant administrator, which is provided by the purchase manager 54a of the MPS 10a, together with the user information. Next, the client registration unit 142a of the E2EO unit 62a updates the realm of a client in the tenant user manager 146a of the created tenant 144a as necessary in accordance with the role assigned to the tenant administrator (S614). This enables both the use of a service of the tenant 144a and the login to the MPS with authentication by the tenant user manager 146a.

On the other hand, the E2EO unit 62 returns the ID of the created tenant to the purchaser terminal 14 to notify the tenant administrator of the ID (S616). At this time, the E2EO unit 62 may also create credential information such as a password that is used when the tenant user manager 146a authenticates the tenant administrator, and notify the tenant administrator of the credential information. Through the above-described process, a process transition path from the marketplace user manager 136 to the tenant user manager 146a, and a process return path from the tenant user manager 146a to the private page of the tenant administrator via the marketplace user manager 136 are formed.

As a result, similar to FIG. 28, a cooperation system (federation) is established between the marketplace user manager 136 and the tenant user manager 146, and authentication and authorization on the tenant 144 side can also be applied to the login to the MPS 10. Although not illustrated in FIG. 33, the tenant user manager 146a may cooperate with a system different from the computer system 1 as in FIG. 28.

Figure 34:
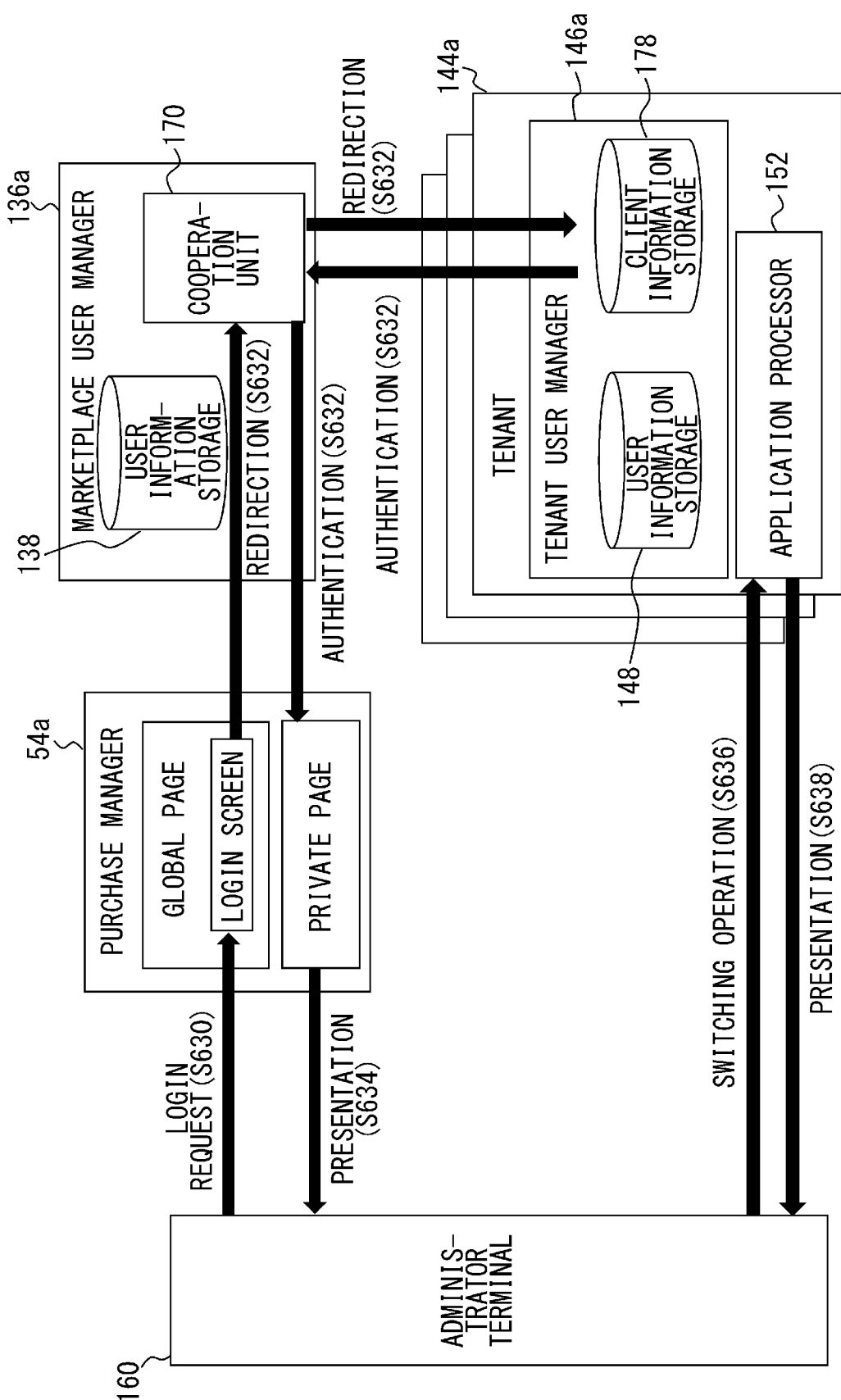
FIG. 34 is a diagram illustrating a procedure of a login process for a tenant administrator according to the second embodiment.

FIG. 34 illustrates a procedure of a login process for a tenant administrator according to the second embodiment. First, when logging in to the MPS 10a, the tenant administrator accesses the global page provided by the purchase manager 54a. Then, the tenant administrator causes the administrator terminal 160 to display the login screen and inputs information necessary for login such as a user ID and a password to make the login request (S630). The login handler 132 of the purchase manager 54a receives the login request and causes a browser to perform a redirect to the marketplace user manager 136a (S632).

The cooperation unit 170 of the marketplace user manager 136a specifies the tenant 144a corresponding to the tenant administrator who is a login request source on the basis of the user information stored in the user information storage 138. Alternatively, the cooperation unit 170 may cause the administrator terminal 160 to display a tenant selection screen and accept selection by the tenant administrator. Then, the cooperation unit 170 further performs a redirect to the tenant user manager 146a of the tenant 144a (S632). The tenant user manager 146a performs the authentication process by, for example, prompting the tenant administrator to input the credential information notified at the time of tenant creation.

When the authentication results in a success, the tenant user manager 146a performs a callback to the marketplace user manager 136a (S632). The cooperation unit 170 of the marketplace user manager 136a specifies the URL of the private page of the tenant administrator who is a login request source on the basis of the user information stored in the user information storage 138. Then, performing a callback to the URL (S632) causes the private page to be presented to the user via the administrator terminal 160 (S634).

At this stage, the status where the tenant administrator has been authenticated by the tenant user manager 146a itself is achieved. Therefore, when the display is switched from the private page provided by the purchase manager 54a to the page provided by the application processor 152 of the tenant 144a (S636), an after-login screen is presented to the administrator terminal 160 (S638). That is, even when a gateway to login is different, the service of the tenant 144a can be utilized in the state since the authentication has been performed on the tenant 144a side.

The procedure of a login process for a general user according to the second embodiment may be the same as the procedure illustrated in FIGS. 30 and 31 according to the first embodiment. Even when the tenant administrator does not log in to the MPS 10a but directly requests a login to the client of the tenant 144a, the login process is performed in the same procedure as for the general user.

According to the above-described second embodiment, the user information on the tenant administrator is automatically registered into the tenant user manager 146a simultaneously with the creation of the tenant. This allows the tenant administrator to use the service of the tenant while logging in to the MPS 10a and thus makes it possible to save time and effort for login to a minimum. Further, information necessary for authentication such as a password can be centrally managed by the tenant 144a, so that security can be further enhanced. Furthermore, effects the same as described in the first embodiment can be obtained.

The present invention has been described on the basis of the embodiments. It is to be understood by those skilled in the art that these embodiments are illustrative and that various modifications are possible for a combination of components or processes, and that such modifications are also within the scope of the present invention.

Industrial Applicability

As described above, the present invention is applicable to various systems that provide network services, a management device of such a system, a device that supports management of such a system, and the like.

REFERENCE SIGNS LIST

1 computer system, 10 marketplace system, 12 network operating system, 14 purchaser terminal, 54 purchase manager, 62 E2EO unit, 130 registration acceptance unit, 132 login handler, 134 purchase acceptance unit, 136 marketplace user manager, 138 user information storage, 140 client information storage, 142 client registration unit, 144 tenant, 146 tenant user manager, 148 user information storage, 150 cooperation unit, 152 application processor, 170 cooperation unit, 172 owner terminal, 174 user registration unit, 178 client information storage

The invention claimed is:

1. A computer system for providing a service corresponding to each of a plurality of tenants, the computer system comprising:
   one or more processors comprising hardware, wherein
   the one or more processors are configured to implement:
   a tenant creation system structured to create a tenant upon receipt of a tenant creation request and including an intra-tenant creation system user manager structured to authenticate and authorize a user who makes the tenant creation request; and
   a tenant operating system structured to run the tenant created,
   wherein
   the tenant operating system includes a tenant user manager structured to authenticate and authorize a user of the service, the tenant user manager being separated from the tenant creation system,
   the intra-tenant creation system user manager and the tenant user manager each being individually constructed and isolated from each other,
   based on receiving a login request from a terminal, the tenant user manager recognizes whether a request source is the user of the service or the user who makes the tenant creation request,
   based on recognizing that the request source is the user who makes the tenant creation request, the tenant user manager delegates, to the intra-tenant creation system user manager, authentication and authorization of the user who has made the tenant creation request, and based on recognizing that the request source is the user of the service, the tenant user manager performs the authentication and the authorization of the user of the service.

2. The computer system according to claim 1, wherein the tenant operating system includes the tenant user manager structured to authenticate and authorize a user of the service for each tenant.

3. The computer system according to claim 1, wherein the tenant creation system includes a client information storage structured to store client information used for returning the processing to a client after authentication performed upon receipt of a delegation request from the tenant user manager.

4. The computer system according to claim 1, wherein the tenant creation system delegates authentication and authorization of a user, who has requested a login to the tenant creation system, to the tenant user manager of a tenant, the tenant being created in response to a request from the user.

5. The computer system according to claim 4, wherein the tenant creation system includes a user information storage structured to store information on a user who has made the tenant creation request and identifier information for a created tenant associated with each other, and the tenant creation system consults the user information storage to identify a tenant to be a delegation destination.

6. The computer system according to claim 4, wherein the tenant creation system includes a user information storage structured to store information on a user who has made the tenant creation request and a uniform resource locator (URL) of a private page of the user in the tenant creation system associated with each other, and the tenant creation system consults the user information storage to cause a transition of display to the private page after authentication performed by the delegation destination.

7. The computer system according to claim 4, wherein the tenant creation system receives a user registration request for the tenant creation system as the tenant creation request, creates a tenant, and stores information on a user who has made the user registration request into the tenant user manager of the tenant created.

8. The computer system according to claim 1, wherein the tenant creation system creates the tenant user manager in response to the creation of the tenant, the tenant user manager being associated with the tenant.

9. The computer system according to claim 8, wherein the tenant creation system creates each tenant user manager as a separate container.

10. A user management method applied to a computer system for providing a service corresponding to each of a plurality of tenants, the user management method comprising:

causing a tenant creation system to create a tenant upon receipt of a tenant creation request;

causing an intra-tenant creation system user manager to authenticate and authorize a user who makes the tenant creation request;

causing a tenant operating system to run the tenant created;

causing the tenant operating system to authenticate and authorize a user of the service using a tenant user manager separated from the tenant creation system, wherein the intra-tenant creation system user manager and the tenant user manager are each individually constructed and isolated from each other;

causing, based on receiving a login request from a terminal, the tenant user manager to recognize whether a request source is the user of the service or the user who makes the tenant creation request;

causing, based on recognizing that the request source is the user who makes the tenant creation request, the tenant user manager to delegate, to the intra-tenant creation system user manager, authentication and authorization of the user who has made the tenant creation request; and causing, based on recognizing that the request source is the user of the service, the tenant user manager to perform the authentication and the authorization of the user of the service.

* * * * *